United States Patent [19]

Milligan et al.

[11] Patent Number: 5,124,987
[45] Date of Patent: Jun. 23, 1992

[54] LOGICAL TRACK WRITE SCHEDULING SYSTEM FOR A PARALLEL DISK DRIVE ARRAY DATA STORAGE SUBSYSTEM

[75] Inventors: Charles A. Milligan, Golden; George A. Rudeseal, Boulder, both of Colo.

[73] Assignee: Storage Technology Corporation, Louisville, Colo.

[21] Appl. No.: 509,484

[22] Filed: Apr. 16, 1990

[51] Int. Cl.$^5$ ............................................. G06F 11/00
[52] U.S. Cl. .................................................. 371/10.1
[58] Field of Search ...................................... 371/10.1

[56] References Cited

U.S. PATENT DOCUMENTS

| | | | |
|---|---|---|---|
| 4,204,634 | 5/1980 | Borsuhn et al. | 371/40.1 |
| 4,254,500 | 3/1981 | Brookhart | 371/40.1 |
| 4,653,050 | 3/1987 | Vaillancourt | 371/10.1 |
| 4,771,375 | 9/1988 | Beglin et al. | 364/200 |
| 4,896,259 | 1/1990 | Jacobs et al. | 364/200 |
| 4,899,342 | 2/1990 | Potter et al. | 371/10.1 |
| 4,942,575 | 7/1990 | Earnshaw et al. | 371/10.1 |

OTHER PUBLICATIONS

David L. Butlman; *High Performance SCSI Using Parallel Drive Technology;* Feb. 22-25, 1988; BUSCON WEST Bus/Board Users Show and Conference.

David A. Patterson, et al.; *A Case for Redundant Arrays of Inexpensive Disks* (RAID); Jun. 1-3, 1988; ACM SIGMOD Conference in Chicago, IL.

David A. Patterson et al.; *Introduction to Redundant Arrays of Inexpensive Disks* (RAID); Feb. 27-Mar. 3, 1989; Thirty-Fourth IEEE Computer Society International Conference in San Francisco, CA.

A Case for Redundant Arrays of Inexpensive Disks (RAID), Patterson et al., ACM SIGMOND Conference Jun. 1988.

Hayes, Computer Architecture and Organization, ©1978, pp. 361-364.

IBM Tech. Dics. Bull., vol. 31, No. 10, pp. 141-142, Mar. 1989.

*Primary Examiner*—Jerry Smith
*Assistant Examiner*—Henry C. Lebowitz
*Attorney, Agent, or Firm*—Dorr, Carson, Sloan & Peterson

[57] ABSTRACT

The parallel disk drive array data storage subsystem maps between virtual and physical data storage devices and schedules the writing of data to these devices. The data storage subsytem functions as a conventional large form factor disk drive memory, using an array of redundancy groups, each containing N+M disk drives. A performance improvement is obtained by eliminating redundancy data updates in the redundancy group by writing modified virtual track instances into previously emptied logical tracks and marking the data contained in the previous virtual track instance location as invalid. Logical cylinders containing a mixture of valid and invalid virtual tracks are emptied by writing all the valid virtual tracks into a previously emptied logical cylinder as a background process.

80 Claims, 9 Drawing Sheets

LOGICAL TRACK WRITE SCHEDULING SYSTEM FOR A PARALLEL DISK DRIVE ARRAY DATA STORAGE SUBSYSTEM

FIELD OF THE INVENTION

This invention relates to an inexpensive, high performance, high reliability parallel disk drive array data storage subsystem that includes an efficient data storage management system to dynamically map virtual data storage devices to logical data storage devices and schedule the writing of data on these devices.

PROBLEM

It is a problem in the field of computer systems to provide inexpensive, high performance, high reliability memory that can efficiently process changes to the data stored therein. This problem is especially severe in the case of disk drive memory systems. The typical commercially available disk drive is a 14-inch form factor unit, such as the IBM 3380K disk drive, that is a dual-actuator unit divided into two sections per spindle. The data storage capacity of the IBM 3380K disk drive is 3.6 gigabytes of data, which is divided into the two sections, each of which is equipped with a single actuator and can store on the order of 1.8 gigabytes of data. In order to improve access time to the most frequently used data stored on the disk drive, cached DASD controllers, such as the IBM 3990 Model 3 Storage Control, are used to interconnect a plurality of these disk drives with the host processors. Modifications to the data records stored on the disk drive are typically done in the cache memory and each modified data record is then rewritten into its designated location on the disk drive. The associated host processor typically stores data files on the disk drive memory by writing an entire data file onto a single disk drive. In these typical disk drive memory systems, there is a fixed mapping of data storage addresses used by the associated host processor to physical locations on the disk drive memory. This simplifies the data storage management which must be done by the disk storage control.

An alternative to host processor controlled memory mapping is disclosed in the virtual storage system of U.S. Pat. No. 4,467,421. This virtual storage system receives data files from associated host processors. The extent of a particular data file is not specified by the user nor allocated by the host processor in anticipation of future memory space requirements. The data file is stored in a cache memory in the virtual storage system, its size is determined and the data file may also be compressed. The virtual storage system then divides user-defined data sets into blocks of a size convenient for storage on magnetic media such as disk drives. These blocks are assigned to data storage locations in the disk drives determined by a control processor in the virtual storage system.

An alternative to the large form factor disk drives for storing data is the use of a multiplicity of small form factor disk drives interconnected in a parallel array. Such an arrangement is the Micropolis Parallel Drive Array, Model 1804 SCSI (disclosed in U.S. Pat. No. 4,870,643 issued Sept. 26, 1989) that uses four, parallel, synchronized disk drives and one redundant parity disk drive. This arrangement uses parity protection, provided by the parity disk drive, to increase data reliability. The failure of one of the four data disk drives can be recovered from by the use of the parity bits stored on the parity disk drive. The data disk drives, when connected together, form a "logical disk drive" which is used by the data storage system as a virtual disk drive to emulate the characteristics of the large form factor disk drives. This architecture multiplies the data transfer rate of a single data disk drive by the number of data disk drives connected in parallel to achieve high data transfer rates. However, reading/writing data requires access to all disk drives in the parity group and there are too few independent actuators. For small data transfers, system performance is dominated by data access time and with only a single actuator, this system has a high data transfer rate but a poor data access time. This architecture also suffers from having to update the parity data on the parity disk for all data file modifications.

A similar system is disclosed in U.S. Pat. No. 4,722,085 wherein a high capacity disk drive memory is disclosed. This disk drive memory uses a plurality of relatively small, synchronously operating disk subsystems to function as a large, high capacity disk drive having an unusually high fault tolerance and a very high data transfer bandwidth. A data organizer adds seven error check bits to each 32 bit data word to provide error checking and error correction capability. The resultant 39 bit word is written, one bit per disk drive, on to 39 disk drives. In the event that one of the 39 disk drives fails, the remaining 38 bits of the stored 39 bit word can be used to reconstruct the 32 bit data word on a word-by-word basis as each data word is read from memory, thereby obtaining fault tolerance. A limitation of the disk drive memory system of U.S. Pat. No. 4,722,085 is that this parallel disk drive array architecture uses tightly coupled disk actuators. This arrangement has a high data transfer bandwidth but effectively only a single logical actuator position for 2.75 gigabytes of memory. This adversely affects the random access to memory performance of this disk drive memory system since all memory can only be accessed through the single logical actuator.

Another disk drive array architecture is disclosed in the paper entitled "A Case for Redundant Arrays of Inexpensive Disks (RAID)" by David A. Patterson et al., published June 1-3, 1988 in the Proceedings of the ACM SIGMOD Conference. The RAID paper discusses five disk array configurations. The Second and Third Level RAIDs use tightly coupled actuators on a plurality of disk drives within a redundancy group to spread a data transfer across all disk drives within the redundancy group rather than writing data to a single disk drive. This parallel data transfer increases the data transfer bandwidth but requires synchronized access to all the disk drives in a redundancy group to read/write data. An example of a Second Level RAID system is that disclosed in the above-mentioned U.S. Pat. No. 4,722,085 while the U.S. Pat. No. 4,870,643 is an example of a Third Level RAID system. The Fourth Level RAID avoids this problem by using loosely coupled actuators on the plurality of disk drives in the parity group and by writing a block of data to a single sector on one disk drive rather than distributing the block of data across all the disk drives within the parity group. The Fifth Level RAID is a variation of the Fourth Level RAID wherein the parity data is distributed across all the disk drives within the parity group rather than using a dedicated parity disk drive.

A significant difficulty with the Fourth and Fifth Level RAID systems is that the parity for the parity group must be updated every time data is written into the parity group. In disk array systems, every time a data record is read from one of the n data disks in a parity group and modified, the corresponding data records on the remaining n−1 data disks must also be read from the parity group in order to regenerate the parity segment. Once the new parity is calculated, the n+1 segments must all be rewritten to the n+1 disk drives in the parity group. The Fourth and Fifth level RAID systems exclusive OR the old data, old parity and new data to regenerate the parity segment, thereby reducing the n+1 reads and writes to two concurrent reads and writes. If multiple check bits, such as for a Reed-Solomon code, are used in place of a single parity bit, the performance impact of check bit updating is multiplied. The negative impact on performance increases with the number of check bits. Performance of such a multiple check bit RAID system is poor and is not competitive with existing large form factor DASD products. Existing systems sacrifice the additional data integrity potentially provided by multiple check bits for the lesser performance degradation caused by maintaining only a single parity bit.

SOLUTION

The above described problems are solved and a technical advance achieved in the field by the logical track write scheduling system for a parallel disk drive array data storage subsystem which uses a large plurality of small form factor disk drives to implement an inexpensive, high performance, high reliability disk drive memory that emulates the format and capability of large form factor disk drives. This system avoids the parity update problem of the prior art by never updating the parity in a data redundancy group. Instead, all new or modified data is written on empty logical tracks and the old data is tagged as obsolete. The resultant "holes" in the logical tracks caused by old data are removed by a background free-space collection process that creates empty logical tracks by collecting valid data into previously emptied logical tracks. By writing the modified data into empty tracks, the number of read and write operations are halved compared to the Fourth and Fifth level RAID systems and the generation of new parity segments is done on the fly as data is received, thereby requiring less processing time than parity regeneration.

The plurality of disk drives in the parallel disk drive array data storage subsystem are configured into a plurality of variable size redundancy groups of N+M parallel connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one on each of N physical tracks per logical track, and to store M redundancy segments, one on each of M physical tracks per logical track in the redundancy group. The N+M disk drives in a redundancy group have unsynchronized spindles and loosely coupled actuators. The data is transferred to the disk drives via independent reads and writes since all disk drives operate independently. Furthermore, the M redundancy segments, for successive logical cylinders, are distributed across all the disk drives in the redundancy group rather than using dedicated redundancy disk drives. The redundancy segments are distributed so that every actuator in a redundancy group is used to access some of the data segments used to access some of the data segments stored on the disk drives. If dedicated drives were provided for redundancy segments, then these disk drives would be inactive unless redundancy segments were being read from or written to these drives. However, with distributed redundancy, all actuators in a redundancy group are available for data access. In addition, a pool of R globally switchable backup disk drives is maintained in the data storage subsystem to automatically substitute a replacement disk drive for a disk drive in any redundancy group that fails during operation. The pool of R backup disk drives provides high reliability at low cost.

Each physical disk drive is designed so that it can detect a failure in its operation, which allows the M redundancy segments per logical track to be used for multi-bit error correction. Identification of the failed physical disk drive provides information on the bit position of the errors in the logical track and the redundancy data provides information to correct the errors. Once a failed disk drive in a redundancy group is identified, a backup disk drive from the shared pool of backup disk drives is automatically switched in place of the failed disk drive. Control circuitry reconstructs the data stored on each physical track of the failed disk drive, using the remaining N−1 physical tracks of data plus the associated M physical tracks containing redundancy segments of each logical track. A failure in the redundancy segments does not require data reconstruction, but necessitates regeneration of the redundancy information. The reconstructed data is then written onto the substitute disk drive. The use of backup disk drives increases the system reliability of the N+M parallel disk drive architecture while the use of a shared pool of backup disk drives minimizes the cost of providing the improved reliability.

The parallel disk drive array data storage subsystem includes a data storage management system that provides improved data storage and retrieval performance by dynamically mapping between virtual and physical data storage devices. The parallel disk drive array data storage subsystem consists of three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. The data storage management system operates to effectuate the dynamic mapping of data among these abstract layers and to control the allocation and management of the actual space on the physical devices. These data storage management functions are performed in a manner that renders the operation of the parallel disk drive array data storage subsystem transparent to the host processor which perceives only the virtual image of the disk drive array data storage subsystem.

The performance of this system is enhanced by the use of a cache memory with both volatile and nonvolatile portions and "backend" data staging and destaging processes. Data received from the host processors is stored in the cache memory in the form of modifications to data already stored in the redundancy groups of the data storage subsystem. No data stored in a redundancy group is modified. A virtual track is staged from a redundancy group into cache. The host then modifies some, perhaps all, of the records on the virtual track. Then, as determined by cache replacement algorithms such as Least Recently Used, etc, the modified virtual track is selected to be destaged to a redundancy group. When thus selected, a virtual track is divided (marked off) into several physical sectors to be stored on one or more physical tracks of one or more logical tracks. A complete physical track may contain physical sectors from one or more virtual tracks. Each physical track is combined with N−1 other physical tracks to form the N data segments of a logical track.

The original, unmodified data is simply flagged as obsolete. Obviously, as data is modified, the redundancy groups increasingly contain numerous virtual tracks of obsolete data. The remaining valid virtual tracks in a logical cylinder are read to the cache memory in a background "free space collection" process. They are then written to a previously emptied logical cylinder and the "collected" logical cylinder is tagged as being empty. Thus, all redundancy data creation, writing and free space collection occurs in background, rather than on-demand processes. This arrangement avoids the parity update problem of existing disk array systems and improves the response time versus access rate performance of the data storage subsystem by transferring these overhead tasks to background processes.

DETAILED DESCRIPTION OF THE DRAWING

Figure 1:
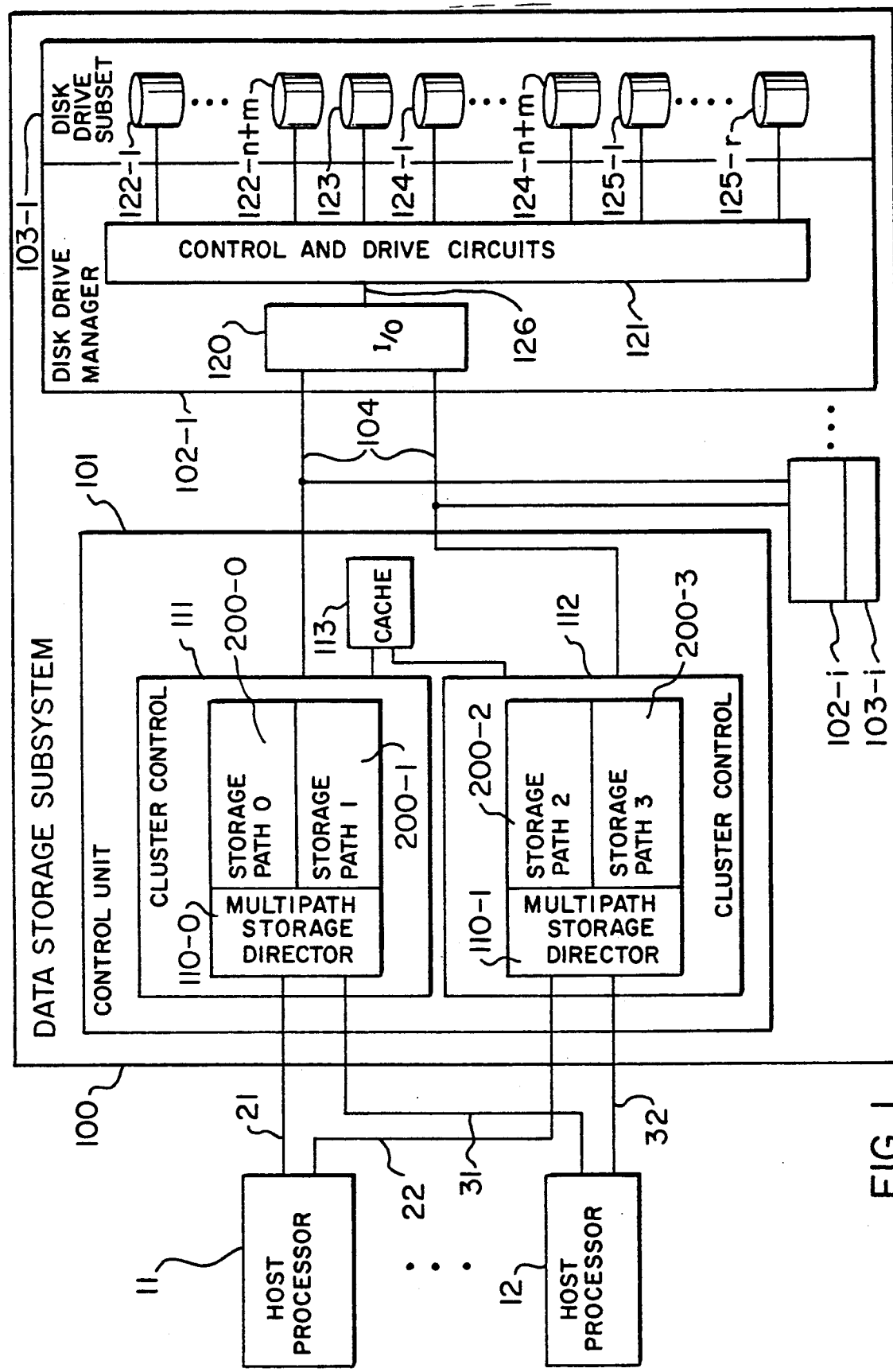
FIG. 1 illustrates in block diagram form the architecture of the parallel disk drive array data storage subsystem.

The data storage subsystem of the present invention uses a plurality of small form factor disk drives in place of a single large form factor disk drive to implement an inexpensive, high performance, high reliability disk drive memory that emulates the format and capability of large form factor disk drives. This system avoids the parity update problem of the prior art by never updating the parity. Instead, all new or modified data is written on empty logical tracks and the old data is tagged as obsolete. The resultant "holes" in the logical tracks caused by old data are removed by a background free-space collection process that creates empty logical tracks by collecting valid data into previously emptied logical tracks.

The plurality of disk drives in the parallel disk drive array data storage subsystem are configured into a plurality of variable size redundancy groups of N+M parallel connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one on each of N physical tracks per logical track, and to store M redundancy segments, one on each of M physical tracks per logical track in the redundancy group. The N+M disk drives in a redundancy group have unsynchronized spindles and loosely coupled actuators. The data is transferred to the disk drives via independent reads and writes since all disk drives operate independently. Furthermore, the M redundancy segments, for successive logical cylinders, are distributed across all the disk drives in the redundancy group rather than using dedicated redundancy disk drives. The redundancy segments are distributed so that every actuator in a redundancy group is used to access some of the data segments stored on the disk drives. If dedicated drives were provided for redundancy segments, then these disk drives would be inactive unless redundancy segments were being read from or written to these drives. However, with distributed redundancy, all actuators in a redundancy group are available for data access. In addition, a pool of R globally switchable backup disk drives is maintained in the data storage subsystem to automatically substitute a replacement disk drive for a disk drive in any redundancy group that fails during operation. The pool of R backup disk drives provides high reliability at low cost.

Each physical disk drive is designed so that it can detect a failure in its operation, which allows the M redundancy segments per logical track to be used for multi-bit error correction. Identification of the failed physical disk drive provides information on the bit position of the errors in the logical track and the redundancy data provides information to correct the errors. Once a failed disk drive in a redundancy group is identified, a backup disk drive from the shared pool of backup disk drives is automatically switched in place of the failed disk drive. Control circuitry reconstructs the data stored on each physical track of the failed disk drive, using the remaining N−1 physical tracks of data plus the associated M physical tracks containing redundancy segments of each logical track. A failure in the redundancy segments does not require data reconstruction, but necessitates regeneration of the redundancy information. The reconstructed data is then written onto the substitute disk drive. The use of backup disk drives increases the system reliability of the N+M parallel disk drive architecture while the use of a shared pool of backup disk drives minimizes the cost of providing the improved reliability.

The parallel disk drive array data storage subsystem includes a data storage management system that provides improved data storage and retrieval performance by dynamically mapping between virtual and physical data storage devices. The parallel disk drive array data storage subsystem consists of three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. The data storage management system operates to effectuate the dynamic mapping of data among these abstract layers and to control the allocation and management of the actual space on the physical devices. These data storage management functions are performed in a manner that renders the operation of the parallel disk drive array data storage subsystem transparent to the host processor which perceives only the virtual image of the disk drive array data storage subsystem.

The performance of this system is enhanced by the use of a cache memory with both volatile and nonvolatile portions and "backend" data staging and destaging processes. Data received from the host processors is stored in the cache memory in the form of modifications to data already stored in the redundancy groups of the data storage subsystem. No data stored in a redundancy group is modified. A virtual track is staged from a redundancy group into cache. The host then modifies some, perhaps all, of the records on the virtual track. Then, as determined by cache replacement algorithms such as Least Recently Used, etc, the modified virtual track is selected to be destaged to a redundancy group. When thus selected, a virtual track is divided (marked off) into several physical sectors to be stored on one or more physical tracks of one or more logical tracks. A complete physical track may contain physical sectors from one or more virtual tracks. Each physical track is combined with $N-1$ other physical tracks to form the N data segments of a logical track.

The original, unmodified data is simply flagged as obsolete. Obviously, as data is modified, the redundancy groups increasingly contain numerous virtual tracks of obsolete data. The remaining valid virtual tracks in a logical cylinder are read to the cache memory in a background "free space collection" process. They are then written to a previously emptied logical cylinder and the "collected" logical cylinder is tagged as being empty. Thus, all redundancy data creation, writing and free space collection occurs in background, rather than on-demand processes. This arrangement avoids the parity update problem of existing disk array systems and improves the response time versus access rate performance of the data storage subsystem by transferring these overhead tasks to background processes.

Data Storage Subsystem Architecture

FIG. 1 illustrates in block diagram form the architecture of the preferred embodiment of the parallel disk drive array data storage subsystem 100. The parallel disk drive array data storage subsystem 100 appears to the associated host processors 11-12 to be a collection of large form factor disk drives with their associated storage control, since the architecture of parallel disk drive array data storage subsystem 100 is transparent to the associated host processors 11-12. This parallel disk drive array data storage subsystem 100 includes a plurality of disk drives (for example 122-1 to 125-r) located in a plurality of disk drive subsets 103-1 to 103-i. The disk drives 122-1 to 125-r are significantly less expensive, even while providing disk drives to store redundancy information and providing disk drives for backup purposes, than the typical 14 inch form factor disk drive with an associated backup disk drive. The plurality of disk drives 122-1 to 125-r are typically the commodity hard disk drives in the 5¼ inch form factor.

The architecture illustrated in FIG. 1 is that of a plurality of host processors 11-12 interconnected via the respective plurality of data channels 21, 22–31, 32, respectively to a data storage subsystem 100 that provides the backend data storage capacity for the host processors 11-12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21-22, 31-32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel for example -21 from any host processor for example 11 to interconnect to a selected cluster control 111 within control unit 101. The cluster control 111 itself provides a pair of storage paths 200-0, 200-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping. These subsystem functions are discussed in further detail below.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signalling interface to transfer signals between the disk drive subset 103-1 and control unit 101.

The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-$n+m$) to form a redundancy group to store the received data. Cluster control 111 selects an empty logical track, consisting of $N+M$ physical tracks, in the selected redundancy group. Each of the N physical tracks of the data are written onto one of N disk drives in the selected data redundancy group.

An additional M disk drives are used in the redundancy group to store the M redundancy segments The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives for example an IBM 3380K type of disk drive) using a plurality of smaller form factor disk drives while providing a high reliability capability by writing the data across a plurality of the smaller form factor disk drives. A reliability improvement is also obtained by providing a pool of R backup disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Disk Drive

Each of the disk drives 122-1 to 125-r in disk drive subset 103-1 can be considered a disk subsystem that consists of a disk drive mechanism and its surrounding control and interface circuitry. The disk drive consists of a commodity disk drive which is a commercially available hard disk drive of the type that typically is used in personal computers. A control processor associated with the disk drive has control responsibility for the entire disk drive and monitors all information routed over the various serial data channels that connect each disk drive 122-1 to 125-r to control and drive circuits 121. Any data transmitted to the disk drive over these channels is stored in a corresponding interface buffer which is connected via an associated serial data channel to a corresponding serial/parallel converter circuit. A disk controller is also provided in each disk drive to implement the low level electrical interface required by the commodity disk drive. The commodity disk drive has an ESDI interface which must be interfaced with control and drive circuits 121. The disk controller provides this function. Disk controller provides serialization and deserialization of data, CRC/ECC generation, checking and correction and NRZ data encoding. The addressing information such as the head select and other type of control signals are provided by control and drive circuits 121 to commodity disk drive 122-1. This communication path is also provided for diagnostic and control purposes. For example, control and drive circuits 121 can power a commodity disk drive down when the disk drive is in the standby mode. In this fashion, commodity disk drive remains in an idle state until it is selected by control and drive circuits 121.

Control Unit

Figure 2:
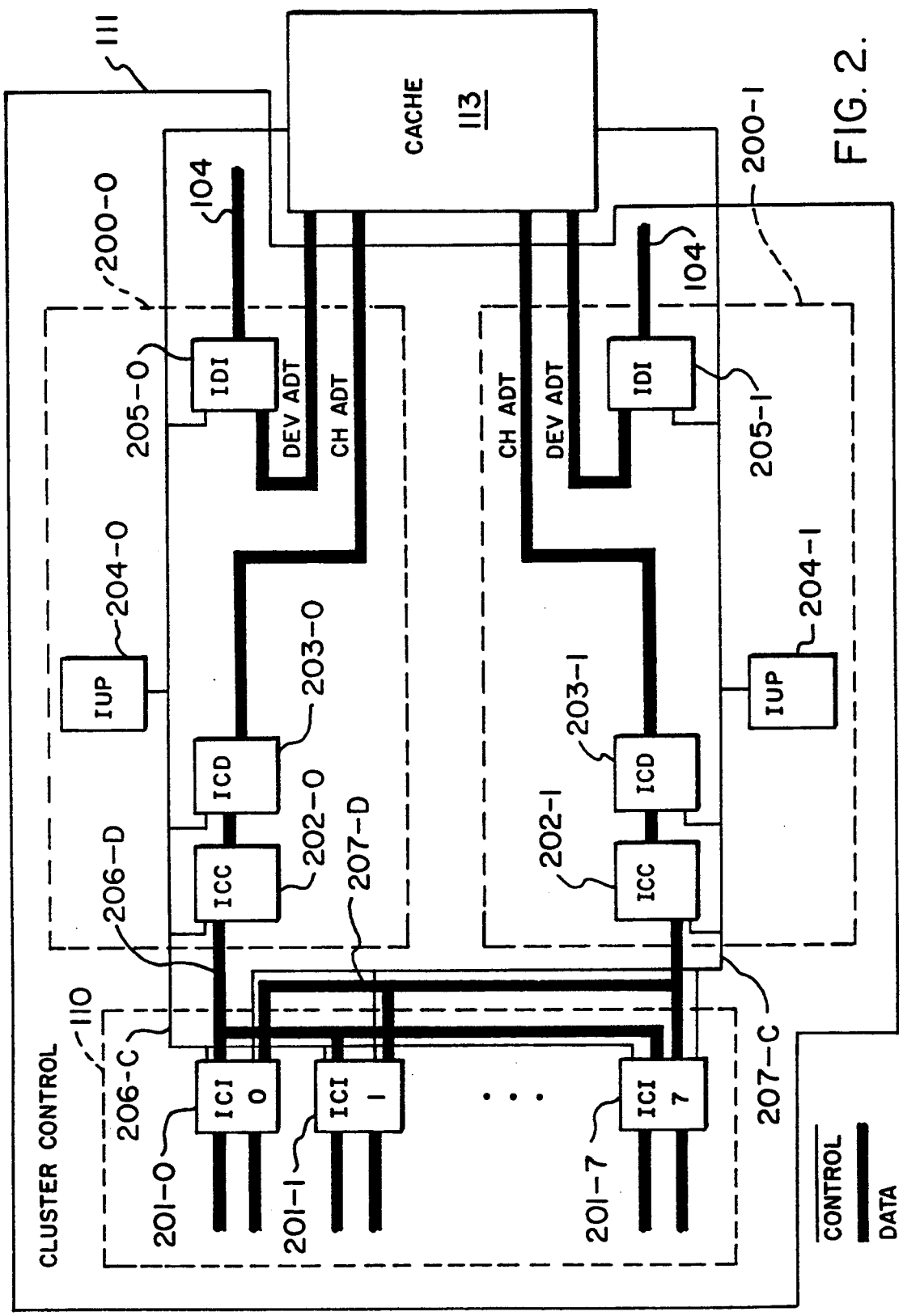
FIG. 2 illustrates the cluster control of the data storage subsystem.

FIG. 2 illustrates in block diagram form additional details of cluster control 111 Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and one of the channel interface units 201 that is presently active with storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 2, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Disk Drive Manager

Figure 3:
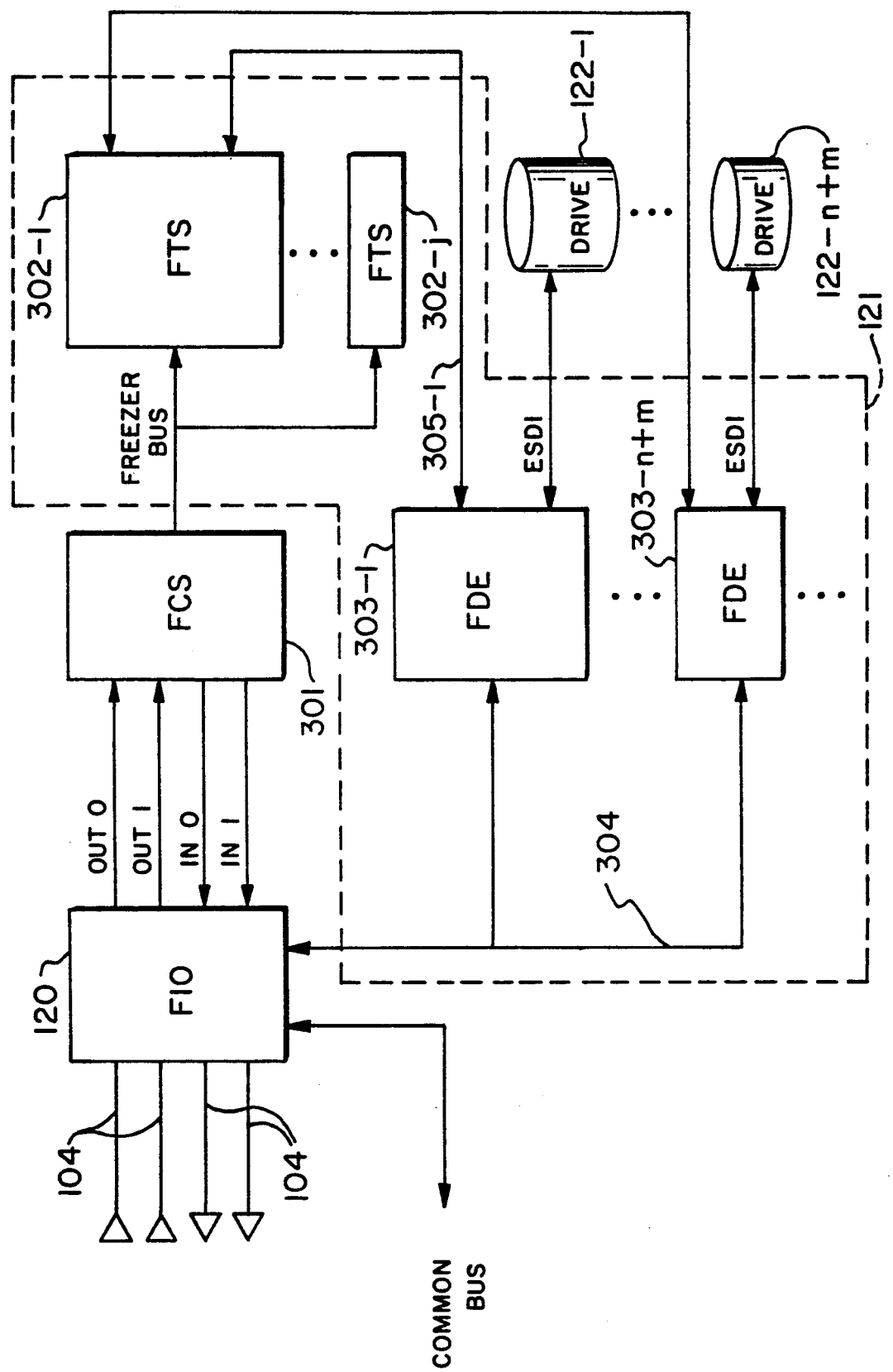
FIG. 3 illustrates the disk drive manager.

FIG. 3 illustrates further block diagram detail of disk drive manager 102-1. Input/output circuit 120 is shown connecting the plurality of optical fiber channels 104 with a number of data and control busses that interconnect input/output circuit 120 with control and drive circuits 121. Control and drive circuits 121 consist of a command and status circuit 301 that monitors and controls the status and command interfaces to the control unit 101. Command and status circuit 301 also collects data from the remaining circuits in disk drive managers 102 and the various disk drives in disk drive subsets 103 for transmission to control unit 101. Control and drive circuits 121 also include a plurality of drive electronics circuits 303, one for each of the commodity disk drives that is used in disk drive subset 103-1. The drive electronics circuits 303 control the data transfer to and from the associated commodity drive via an ESDI interface. The drive electronics circuit 303 is capable of transmitting and receiving frames on the serial interface and contains a microcontroller, track buffer, status and control registers and industry standard commodity drive interface. The drive electronics circuit 303 receives data from the input/output circuit 120 via an associated data bus 304 and control signals via control leads 305. Control and drive circuits 121 also include a plurality of subsystem circuits 302-1 to 302-j, each of which controls a plurality of drive electronics circuits 303. The subsystem circuit 302 controls the request, error and spin up lines for each drive electronics circuit 303. Typically, a subsystem circuit 302 interfaces with thirty-two drive electronics circuits 303. The subsystem circuit 302 also functions to collect environmental sense information for transmission to control unit 101 via command and status circuit 301. Thus, the control and drive circuits 121 in disk drive manager 102-1 perform the data and control signal interface and transmission function between the commodity disk drives of disk drive subset 103-1 and control unit 101.

Command and Status Circuit

Figure 4:
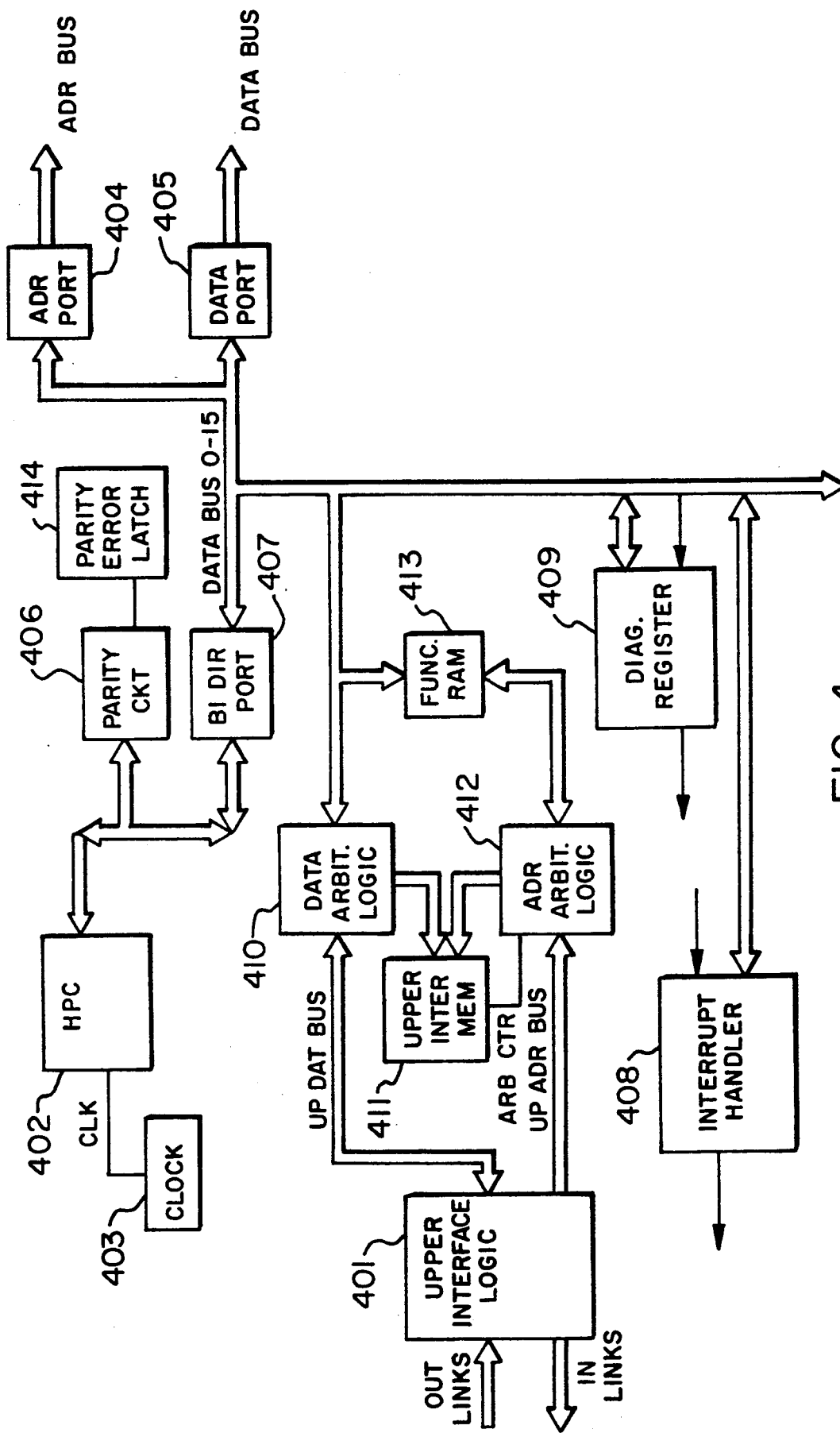
FIG. 4 illustrates the disk drive manager control circuit.

The command and status circuit 301 is illustrated in further detail in FIG. 4. The circuit has three main functions: collect status from the various subsystem circuits 302, report status to control unit 101 and provide diagnostics for disk drive manager 102-1. Command and status circuit 301 is controlled by a processor 402 and its associated clock 403. Processor 402 communicates with the address and data busses via ports 404 and 405 respectively. The direction of communication between processor and the busses and the remaining circuits in command and status circuit 301 is controlled by bidirectional port 407 which acts as an arbiter to regulate access to the internal bus of command and status circuit 301. Similarly, data and address arbitration logic circuits 410 and 412 regulate the access of the interface circuit 401 to the internal data bus of command and status circuit 301. For example, data received from input/output circuit 120 is received by the interface circuit 401 which stores this data in memory 411 via address and data busses that are connected between interface circuit 401 and the data and address arbitration logic 410 and 412. These arbitration circuits regulate access to memory 411 from the internal data bus of command and status circuit 301 and interface circuit 401. Similarly, processor 402 can access the data stored in memory 411 via the internal data bus of command and status circuit 301 and the corresponding data and address arbitration logic 410, 412. This data retrieved by processor 402 can then be output via address and data busses to the subsystem circuits 302 via address and data ports 404, 405 respectively.

Command and status circuit 301 includes interrupt handler 408. All interrupts in disk drive manager 102-1, except for reset, are brought through interrupt handler 408. Interrupt handler 408 collects all interrupts of a particular class which interrupts are read by interrupt software in processor 402. The interrupt software reads the memory mapped space in interrupt handler 408 to determine the bit pattern which indicates what interrupt has occurred.

Drive Electronics Circuit

Figure 5:
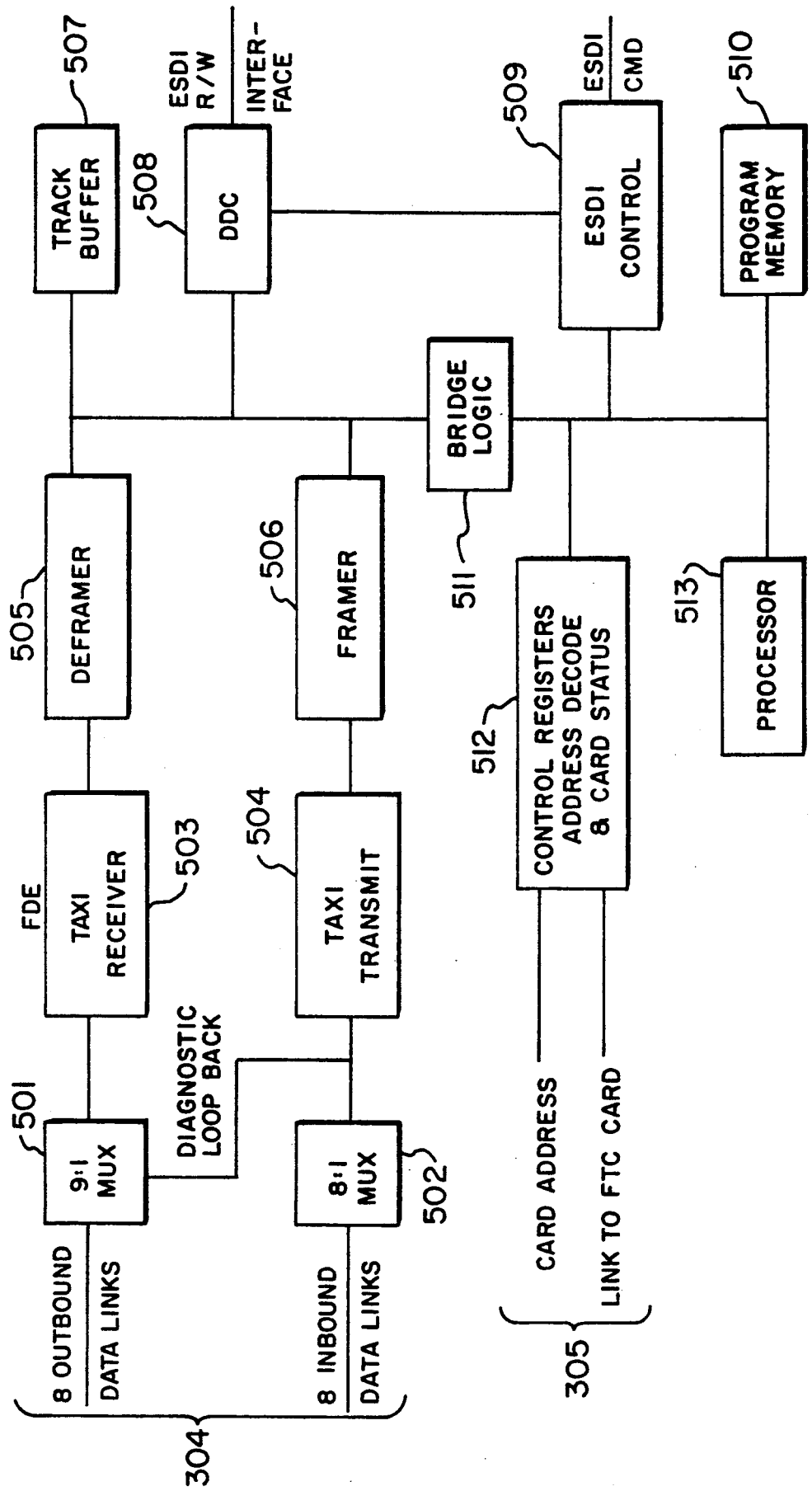
FIG. 5 illustrates the disk drive manager disk control electronics.

The drive electronics circuit 303 functions as an interface between the serial data links 304 that interconnect the input/output circuit 120 and the industry standard commodity disk drive such as drive 122-1. FIG. 5 illustrates additional details of drive electronics circuit 303. The serial data links 304 consist of eight outbound data links and eight inbound data links that are coupled via multiplexers 501 and 502 respectively to the internal circuitry of drive electronics circuit 303.

Receiver 503 monitors the outbound data links and converts the information received from input/output circuit 120 into a parallel format for use by deframer circuit 505. Deframer circuit 505 checks if the destination address field in the received frame correlates with the drive electronics circuit's preprogrammed selection address. If the addresses are the same, deframer circuit 505 determines if the information being transmitted is data or a command, then stores the information in track buffer 507 using one of two DMA pointers, one for data storage and the other for command storage. Track buffer circuit 507 is capable of storing one complete physical track of information for transmission to the associated commodity disk drive 122-1. Deframer circuit 505 generates an interrupt when the transfer of a physical track of information is completed. The interrupt generated by deframer 505 is transmitted to processor 513, which interprets the command or data stored in track buffer 507 and acts accordingly. If processor 513 determines that the command is a data transfer command it initializes the control registers 512 for the data transfer. Processor 513 also activates ESDI control circuit 509 which provides the physical interface between the associated commodity disk drive 122-1 and the internal circuit of drive electronics circuit 303-1. Processor 513 also activates disk data controller circuit 508 which functions to interface commodity disk drives with microprocessor controlled systems. The disk data controller 508 is responsible for the data transfer from track buffer 507 to the ESDI control circuit 509. Therefore, the data path is from track buffer 507 through disk data controller 508 and ESDI control circuit 509 to the commodity disk drive 122-1. The ESDI control circuit 509 simply provides the electrical interface between drive electronics circuit 303-1 and disk drive 122-1.

Data transfers from the disk drive 122-1 to input/output circuit 120 are accomplished in similar fashion. The data is read by processor 513 in response to a request for a data read from control unit 101 by addressing the data on disk drive 122-1 via ESDI control circuit 509. The data read from drive 122-1 is routed through ESDI control circuit 509 and disk data controller 508 to track buffer 507 where it is stored until a complete physical track or a meaningful part thereof is stored therein. Framer 506 retrieves the physical track from track buffer 507 and formats and frames this physical track and forwards it to transmitter circuit 504. Transmitter circuit 504 transmits the frames serially through one of the eight inbound data links via multiplexer 502 to input/output circuit 120.

Disk Drive Malfunction

The control unit 101 determines whether an individual disk drive in the redundancy group it is addressing has malfunctioned. The control unit 101 that has detected a bad disk drive transmits a control message to disk drive manager 102-1 over the corresponding control signal lead to indicate that a disk drive has failed. When the need for a spare disk drive is detected by the control unit 101, the faulty disk drive is taken out of service and a spare disk drive 125-1 is activated from the spare pool of R disk drives (125-1 to 125-r) by the disk drive manager 102-1, at the request of control unit 101. This is accomplished by rewriting the configuration definition of that redundancy group that contained the bad disk drive. The new selected disk drive 125-1 in the redundancy group (122-1 to 122-$n+m$) is identified by control signals which are transmitted to all of cluster control 111-112. This insures that the system mapping information stored in each of cluster controls 111-112 is kept up to date.

Once the new disk drive (125-1) is added to the redundancy group (122-1 to 122-n+m), it is tested and, if found to be operating properly, it replaces the failed disk drive in the system mapping tables. The control unit 101 that requested the spare disk drive (125-1) reconstructs the data for the new disk drive (125-1) using the remaining $N-1$ operational data disk drives and the available redundancy information from the M redundancy disk drives. Before reconstruction is complete on the disk, data is still available to the host processors 11, 12, although it must be reconstructed on line rather than just reading it from a single disk. When this data reconstruction operation is complete, the reconstructed segments are written on the replacement disk drive (125-1) and the redundancy group is again fully operational.

This dynamically reconfigurable attribute of the data storage subsystem 100 enables this system to be very robust. In addition, the dynamically configurable aspect of the communication path between the cluster controls 111, 112 and the disk drives (122-1) permits the architecture to be very flexible. With the same physical disk drive subset (103-1), the user can implement a disk drive memory that has a high data storage capacity and which requires shorter periodic repair intervals, or a disk drive memory that has a lower data storage capacity with longer required repair intervals simply by changing the number of active disk drives in each redundancy group. In addition, the disk drive memory has the ability to detect new spare disk drives 123 when they are plugged in to the system thereby enabling the disk drive memory to grow as the storage or reliability needs change without having to reprogram the disk drive memory control software.

Dynamic Virtual Device to Logical Device Mapping

With respect to data transfer operations, all data transfers go through cache memory 113. Therefore, front end or channel transfer operations are completely independent of backend or device transfer operations. In this system, staging operations are similar to staging in other cached disk subsystems but destaging transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing subsystems. The subsystem is free to dedicate its processing resources to increasing performance through more intelligent scheduling and data transfer control.

The parallel disk drive array data storage subsystem 100 consists of three abstract layers: virtual, logical and physical. The virtual layer functions as a conventional large form factor disk drive memory. The logical layer functions as an array of storage units that are grouped into a plurality of redundancy groups (for example 122-1 to 122-$n+m$), each containing $N+M$ disk drives to store N physical tracks of data and M physical tracks of redundancy information for each logical track. The physical layer functions as a plurality of individual small form factor disk drives. The data storage management system operates to effectuate the mapping of data among these abstract layers and to control the allocation and management of the actual space on the physical devices. These data storage management functions are performed in a manner that renders the operation of the parallel disk drive array data storage subsystem 100 transparent to the host processors (11-12).

A redundancy group consists of $N+M$ disk drives. The redundancy group is also called a logical volume or a logical device. Within each logical device there are a plurality of logical tracks, each of which is the set of all physical tracks in the redundancy group which have the same physical track address. These logical tracks are also organized into logical cylinders, each of which is the collection of all logical tracks within a redundancy group which can be accessed at a common logical actuator position. A parallel disk drive array data storage subsystem 100 appears to the host processor to be a collection of large form factor disk drives, each of which contains a predetermined number of tracks of a predetermined size called a virtual track. Therefore, when the host processor 11 transmits data over the data channel 21 to the data storage subsystem 100, the data is transmitted in the form of the individual records of a virtual track. In order to render the operation of the parallel disk drive array data storage subsystem 100 transparent to the host processor 11, the received data is stored on the actual physical disk drives (122-1 to 122-$n+m$) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space.

When a virtual track is modified by the host processor 11, the updated instance of the virtual track is not rewritten in data storage subsystem 100 at its original location but is instead written to a new logical cylinder and the previous instance of the virtual track is marked obsolete. Therefore, over time a logical cylinder becomes riddled with "holes" of obsolete data known as free space. In order to create whole free logical cylinders, virtual track instances that are still valid and located among fragmented free space within a logical cylinder are relocated within the parallel disk drive array data storage subsystem 100 in order to create entirely free logical cylinders. In order to evenly distribute data transfer activity, the tracks of each virtual device are scattered as uniformly as possible among the logical devices in the parallel disk drive array data storage subsystem 100. In addition, virtual track instances are padded out if necessary to fit into an integral number of physical device sectors. This is to insure that each virtual track instance starts on a sector boundary of the physical device.

Mapping Tables

It is necessary to accurately record the location of all data within the parallel disk drive array data storage subsystem 100 since the data received from the host processors 11-12 is mapped from its address in the virtual space to a physical location in the subsystem in a dynamic fashion. A virtual track directory is maintained to recall the location of the current instance of each virtual track in the parallel disk drive array data storage subsystem 100. The virtual track directory consists of an entry for each virtual track which the associated host processor 11 can address. The entry contains the logical sector address at which the virtual track instance begins. The virtual track directory entry also contains data indicative of the length of the virtual track instance in sectors. The virtual track directory is stored in non-contiguous pieces of the cache memory 113 and is addressed indirectly through pointers in a virtual device table. The virtual track directory is updated whenever a new virtual track instance is written to the disk drives.

The storage control also includes a free space directory (FIG. 8) which is a list of all of the logical cylinders in the parallel disk drive array data storage subsystem 100 ordered by logical device. Each logical device is cataloged in a list called a free space list for the logical device; each list entry represents a logical cylinder and indicates the amount of free space that this logical cylinder presently contains. This free space directory contains a positional entry for each logical cylinder; each entry includes both forward and backward pointers for the doubly linked free space list for its logical device and the number of free sectors contained in the logical cylinder. Each of these pointers points either to another entry in the free space list for its logical device or is null. The collection of free space is a background process that is implemented in the parallel disk drive array data storage subsystem 100. The free space collection process makes use of the logical cylinder directory which is a list contained in the first sector of each logical cylinder indicative of the contents of that logical cylinder. The logical cylinder directory contains an entry for each virtual track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Data Move/Copy Operation

The data file move/copy operation instantaneously relocates or creates a second instance of a selected data file by merely generating a new set of pointers to reference the same physical memory location as the original set of reference pointers in the virtual track directory. In this fashion, by simply generating a new set of pointers referencing the same physical memory space, the data file can be moved/copied.

This apparatus instantaneously moves the original data file without the time penalty of having to download the data file to the cache memory 113 and write the data file to a new physical memory location. For the purpose of enabling a program to simply access the data file at a different virtual address the use of this mechanism provides a significant time advantage. A physical copy of the original data record can later be written as a background process to a second memory location, if so desired. Alternatively, when one of the programs that can access the data file writes data to or modifies the data file in any way, the modified copy of a portion of the original data file is written to a new physical memory location and the corresponding address pointers are changed to reflect the new location of this rewritten portion of the data file.

In this fashion, a data file can be instantaneously moved/copied by simply creating a new set of memory pointers and the actual physical copying of the data file can take place either as a background process or incrementally as necessary when each virtual track of the data file is modified by one of the programs that accesses the data file.

Virtual Track Directory Source and Target Flags

Each entry in the Virtual Track Directory (VTD) contains two flags associated with the Copy/Move function. The "Source" flag is set whenever a Virtual Track Instance at this Virtual Track Address has been the origin of a copy or move. The Virtual Track Instance pointed to by this entry is not necessarily the Source, but the Virtual Track Instance contains this Virtual Address. If the Source flag is set, there is at least one entry in the Copy Table for this Virtual Address. The "Target" flag is set whenever a Virtual Track Instance contains data that has been the destination of a copy or move. If the Target flag is set, the Virtual Address in the Virtual Track Instance that is pointed to is not that of the VTD Entry.

Copy Table

The format of the Copy Table is illustrated here graphically. The preferred implementation is to have a separate Copy Table for each Logical Device so that there is a Copy Table head and tail pointer associated with each Logical Device; however, the table could just as easily be implemented as a single table for the entire subsystem. The table is ordered such that the sources are in ascending Logical Address order.

COPY TABLE SOURCE HEAD POINTER

-continued

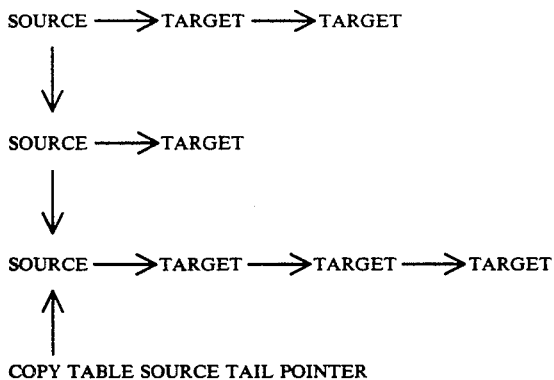

COPY TABLE SOURCE TAIL POINTER

The table is a singly linked list of Sources where each Source is the head of a linked list of Targets. The Source Entry contains the following:
Logical Address (VTD Entry Copy)
Virtual Address
Next Source Pointer (NULL if last Source in list)
Target Pointer
The Target Entry contains the following:
Virtual Address
Next Target Pointer (NULL if last Target in list)
Update Count Fields Flag Mapping Table Fail Soft Techniques It is evident from the above description that the loss of the mapping tables would be catastrophic since the location of the data stored in the parallel disk drive array data storage subsystem 100 is unknown without accurate mapping tables and therefore the data is effectively lost. Since such an occasion is so catastrophic, the mapping tables must be backed up in such a manner as to minimize the impact of a loss of a mapping table. Since the mapping tables are large and are changed on a continuous basis, a totally accurate non-volatile backup copy of the mapping tables is difficult to maintain. The mapping tables are backed up by a pair of alternating fuzzy image copies and a pair of associated control journals. The primary or current copy of the mapping tables is stored in the cache memory 113 while the backup fuzzy image copies are stored on redundancy groups of disk drives 122; the control journals are kept in the non-volatile portion of the cache memory 113. An image copy of a table or a file has traditionally meant a complete sequentially organized copy of all of the file. Therefore a change to the file must be delayed while an image copy is made. In order to eliminate the need for this delay, a fuzzy image copy can be used instead. A fuzzy image copy is an image copy taken while changes are potentially being made to the table or file being copied. In order for the fuzzy image copy to be of any value, a journal of the changes that were made to the file during the time that the image copy was being produced is also stored in a non-volatile memory. Thus, once the fuzzy image copy is produced, the journal of changes can be used to update the fuzzy image copy to be a complete image copy. This produces the correct image of the file as it was at the end of the most recent modifications. The use of two alternating memory areas is necessitated by the fact that when a fuzzy image copy is being updated by the journal of changes, the second memory area stores memory updates occurring during the journal change update process. Therefore, for the mapping table backup, the journals are read out of cache memory 113 and used to update the fuzzy image copy of the mapping tables stored on redundancy groups of disk drives 122. As a further memory protection arrangement, each virtual track instance stored on the disks in the parallel disk drive array data storage subsystem 100 is self defining. Each virtual track instance contains the virtual device identifier and the virtual cylinder and head numbers which are all written within the virtual track instance.

Data Read Operation

Figure 6:
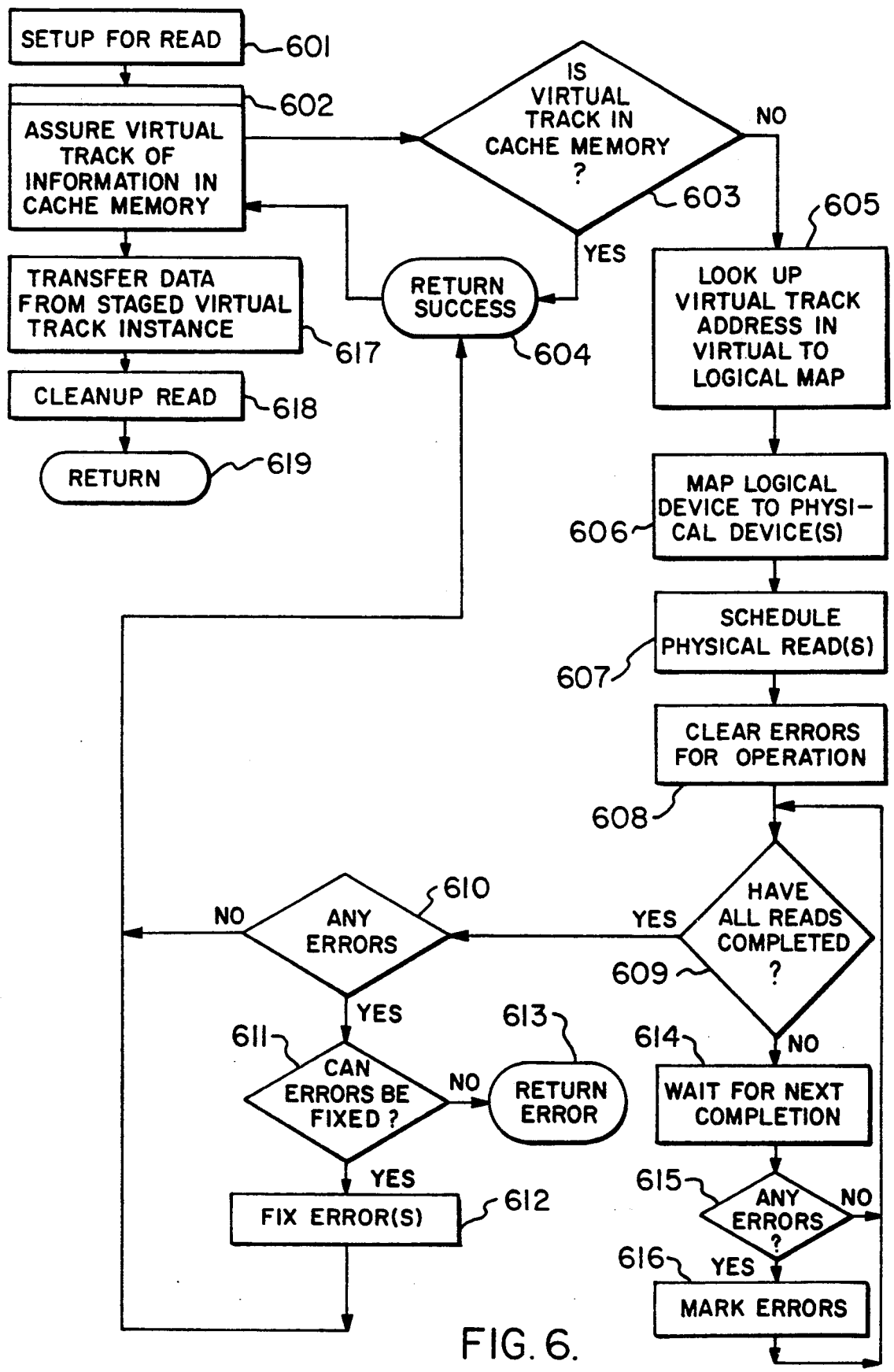
FIGS. 6 and 7 illustrate, in flow diagram form, the operational steps taken to perform a data read and write operation, respectively.

FIG. 6 illustrates in flow diagram form the operational steps taken by processor 204 in control unit 101 of the data storage subsystem 100 to read data from a data redundancy group 122-1 to 122-$n+m$ in the disk drive subsets 103. The parallel disk drive array data storage subsystem 100 supports reads of any size. However, the logical layer only supports reads of virtual track instances. In order to perform a read operation, the virtual track instance that contains the data to be read is staged from the logical layer into the cache memory 113. The data record is then transferred from the cache memory 113 and any clean up is performed to complete the read operation.

At step 601, the control unit 101 prepares to read a record from a virtual track. At step 602, the control unit 101 branches to the cache directory search subroutine to assure that the virtual track is located in the cache memory 113 since the virtual track may already have been staged into the cache memory 113 and stored therein in addition to having a copy stored on the plurality of disk drives (122-1 to 122-$n+m$) that constitute the redundancy group in which the virtual track is stored. At step 603, the control unit 101 scans the hash table directory of the cache memory 113 to determine whether the requested virtual track is located in the cache memory 113. If it is, at step 604 control returns back to the main read operation routine and the cache staging subroutine that constitutes steps 605–616 is terminated.

Assume, for the purpose of this description, that the virtual track that has been requested is not located in the cache memory 113. Processing proceeds to step 605 where the control unit 101 looks up the address of the virtual track in the virtual to logical map table. At step 606, the logical map location is used to map the logical device to one or more physical devices in the redundancy group. At step 607, the control unit 101 schedules one or more physical read operations to retrieve the virtual track instance from appropriate ones of identified physical devices 122-1 to 122-$n+m$. At step 608, the control unit 101 clears errors for these operations. At step 609, a determination is made whether all the reads have been completed, since the requested virtual track instance may be stored on more than one of the N+M disk drives in a redundancy group. If all of the reads have not been completed, processing proceeds to step 614 where the control unit 101 waits for the next completion of a read operation by one of the N+M disk drives in the redundancy group. At step 615 the next reading disk drive has completed its operation and a determination is made whether there are any errors in the read operation that has just been completed. If there are errors, at step 616 the errors are marked and control proceeds back to the beginning of step 609 where a determination is made whether all the reads have been completed. If at this point all the reads have been completed and all portions of the virtual track instance have been retrieved from the redundancy group, then processing proceeds to step 610 where a determination is made whether there are any errors in the reads that have been completed. If errors are detected then at step 611 a determination is made whether the errors can be fixed. One error correction method is the use of a Reed-Solomon error detection/correction code to recreate the data that cannot be read directly. If the errors cannot be repaired then a flag is set to indicate to the control unit 101 that the virtual track instance can not be read accurately. If the errors can be fixed, then in step 612 the identified errors are corrected and processing returns back to the main routine at step 604 where a successful read of the virtual track instance from the redundancy group to the cache memory 113 has been completed.

At step 617, control unit 101 transfers the requested data record from the staged virtual track instance in which it is presently stored. Once the records of interest from the staged virtual track have been transferred to the host processor 11 that requested this information, then at step 618 the control unit 101 cleans up the read operation by performing the administrative tasks necessary to place all of the apparatus required to stage the virtual track instance from the redundancy group to the cache memory 113 into an idle state and control returns at step 619 to service the next operation that is requested.

Data Write Operation

Figure 7:
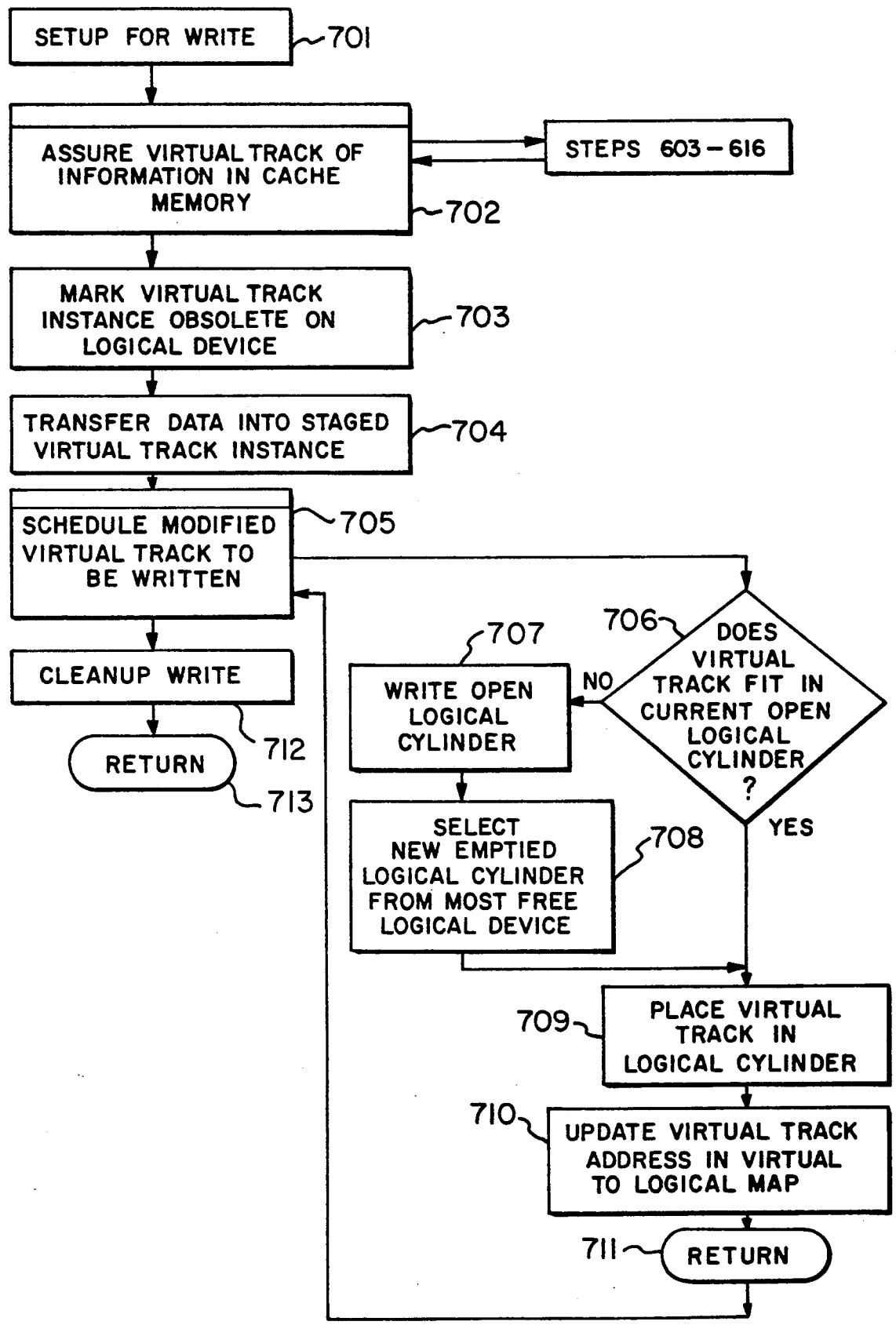

FIG. 7 illustrates in flow diagram form the operational steps taken by the parallel disk drive array data storage subsystem 100 to perform a data write operation. The parallel disk drive array data storage subsystem 100 supports writes of any size, but again, the logical layer only supports writes of virtual track instances. Therefore in order to perform a write operation, the virtual track that contains the data record to be rewritten is staged from the logical layer into the cache memory 113. Once the write operation is complete, the location of the obsolete instance of the virtual track is marked as free space. The modified data record is then transferred into the virtual track and this updated virtual track instance is then scheduled to be written from the cache memory 113 where the data record modification has taken place into the logical layer. Any clean up of the write operation is then performed once this transfer and write is completed.

At step 701, the control unit 101 performs the set up for a write operation and at step 702, as with the read operation described above, the control unit 101 branches to the cache directory search subroutine to assure that the virtual track into which the data is to be transferred is located in the cache memory 113. Since all of the data updating is performed in the cache memory 113, the virtual track in which this data is to be written must be transferred from the redundancy group in which it is stored to the cache memory 113 if it is not already resident in the cache memory 113. The transfer of the requested virtual track instance to the cache memory 113 is performed for a write operation as it is described above with respect to a data read operation and constitutes steps 603–616 illustrated in FIG. 6 above.

At step 703, the control unit 101 marks the virtual track instance that is stored in the redundancy group as invalid in order to assure that the logical location at which this virtual track instance is stored is not accessed in response to another host processor 12 attempting to read or write the same virtual track. Since the modified record data is to be written into this virtual track in the cache memory 113, the copy of the virtual track that resides in the redundancy group is now inaccurate and must be removed from access by the host processors 11-12. At step 704, the control unit 101 transfers the modified record data received from host processor 11 into the virtual track that has been retrieved from the redundancy group into the cache memory 113 to thereby merge this modified record data into the original virtual track instance that was retrieved from the redundancy group. Once this merge has been completed and the virtual track now is updated with the modified record data received from host processor 11, the control unit 101 must schedule this updated virtual track instance to be written onto a redundancy group somewhere in the parallel disk drive array data storage subsystem 100.

This scheduling is accomplished by the subroutine that consists of steps 706-711. At step 706, the control unit 101 determines whether the virtual track instance as updated fits into an available open logical cylinder. If it does not fit into an available open logical cylinder, then at step 707 then this presently open logical cylinder must be closed out and written to the physical layer and another logical cylinder selected from the most free logical device or redundancy group in the parallel disk drive array data storage subsystem 100. At step 708, the selection of a free logical cylinder from the most free logical device takes place. This ensures that the data files received from host processor 11 are distributed across the plurality of redundancy groups in the parallel disk drive array data storage subsystem 100 in an even manner to avoid overloading certain redundancy groups while underloading other redundancy groups. Once a free logical cylinder is available, either being the presently open logical cylinder or a newly selected logical cylinder, then at step 709, the control unit 101 writes the updated virtual track instance into the logical cylinder and at step 710 the new location of the virtual track is placed in the virtual to logical map in order to render it available to the host processors 11-12. At step 711, control returns to the main routine, where at step 712 the control unit 101 cleans up the remaining administrative tasks to complete the write operation and return to an available state at 712 for further read or write operations from host processor 11.

Free Space Collection

Figure 8:
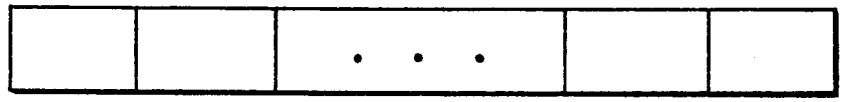
FIG. 8 illustrates a typical free space directory used in the data storage subsystem.
Figure 8:
Figure 8:

When data in cache memory 113 is modified, it cannot be written back to its previous location on a disk drive in disk drive subsets 103 since that would invalidate the redundancy information on that logical track for the redundancy group. Therefore, once a virtual track has been updated, that track must be written to a new location in the data storage subsystem 100 and the data in the previous location must be marked as free space. Therefore, in each redundancy group, the logical cylinders become riddled with "holes" of obsolete data in the form of virtual track instances that are marked as obsolete. In order to create completely empty logical cylinders for destaging, valid data in partially valid cylinders must be read into cache memory 113 and rewritten into new previously emptied logical cylinders. This process is called free space collection. The free space collection function is accomplished by control unit 101. Control unit 101 selects a logical cylinder that needs to be collected as a function of how much free space it contains. The free space determination is based on the free space directory as illustrated in FIG. 8, which indicates the availability of unused memory in data storage subsystem 100. The table illustrated in FIG. 8 is a listing of all of the logical devices contained in data storage subsystem 100 and the identification of each of the logical cylinders contained therein. The entries in this chart represent the number of free physical sectors in this particular logical cylinder. A write cursor is maintained in memory and this write cursor indicates the available open logical cylinder that control unit 101 will write to when data is destaged from cache 113 after modification by associated host processor 11-12 or as part of a free space collection process. In addition, a free space collection cursor is maintained which points to the present logical cylinder that is being cleared as part of a free space collection process. Therefore, control unit 101 can review the free space directory illustrated in FIG. 8 as a backend process to determine which logical cylinder on a logical device would most benefit from free space collection. Control unit 101 activates the free space collection process by reading all of the valid data from the selected logical cylinder into cache memory 113. The logical cylinder is then listed as completely empty, since all of the virtual track instances therein are tagged as obsolete. Additional logical cylinders are collected for free space collection purposes or as data is received from an associated host processor 11-12 until a complete logical cylinder has been filled. Once a complete logical cylinder has been filled, a new previously emptied logical cylinder is chosen.

Figure 9:
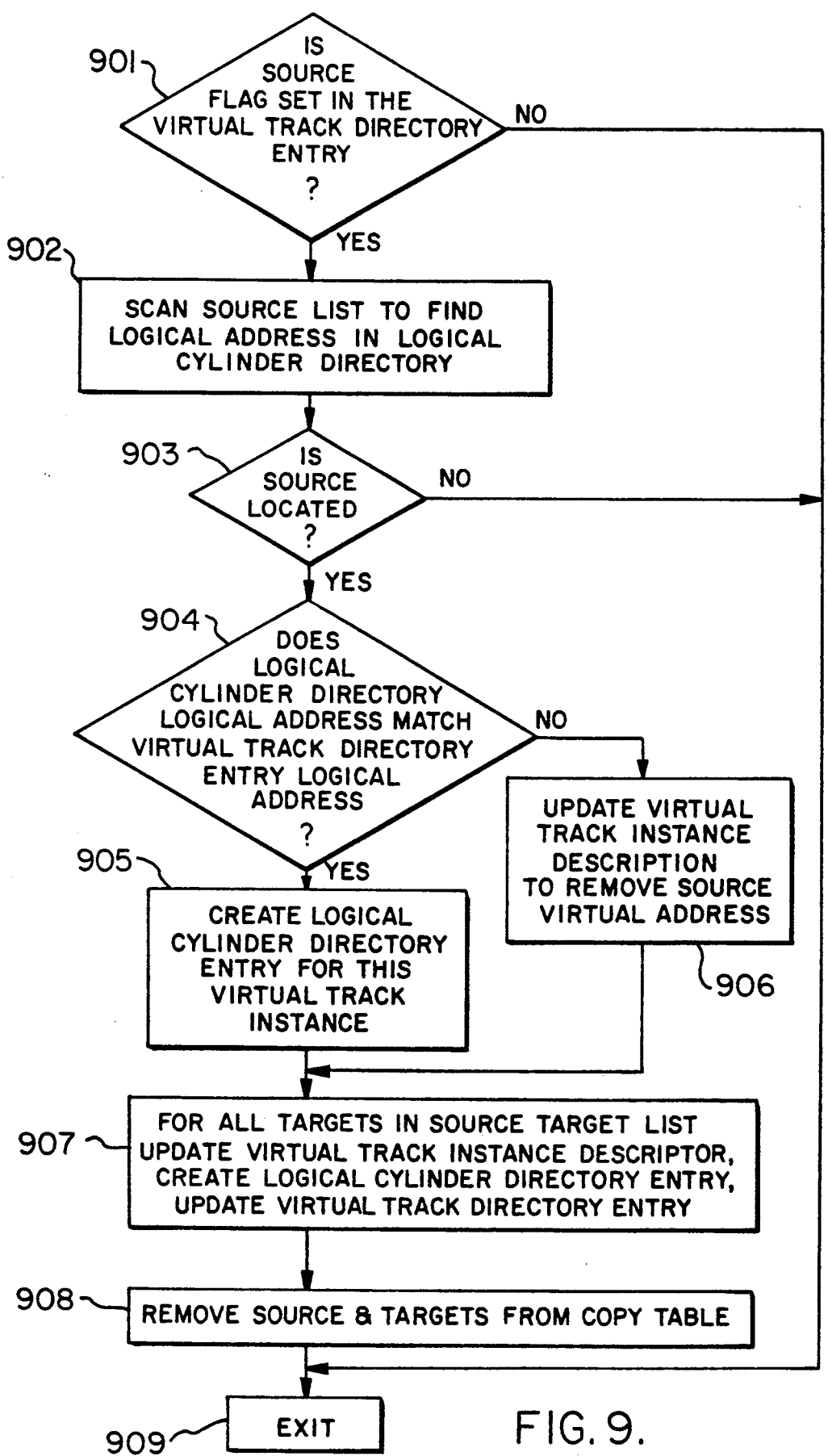
FIG. 9 illustrates, in flow diagram form, the free space collection process.

FIG. 9 illustrates in flow diagram form the operational steps taken by processor 204 to implement the free space collection process. The use of Source and Target Flags is necessitated by the free space collection process since this process must determine whether each virtual track instance contains valid or obsolete data. In addition, the free space collection process performs the move/copy count field adjustment operations listed in the copy table. The basic process is initiated at step 901 when processor 204 selects a logical cylinder for collection based on the number of free logical sectors as listed in the table of FIG. 8. Processor 204 checks each virtual track directory entry to determine if the Source Flag is set. If not, the process exits at step 909 to the next logical track. If the Source Flag is set, at step 902 processor 204 scans the source list to find the logical address in the logical cylinder directory. If no address is found, this virtual track instance is an obsolete version and is no longer needed (invalid). This data is not relocated.

If the address is found, at step 904, processor 204 compares the logical cylinder directory logical address with the virtual track directory entry logical address. If there is a match, processor 204 creates a logical cylinder directory entry for this virtual track instance. If there is not a match, the Source has been updated and exists elsewhere. Processor 204 at step 906 updates the virtual track instance descriptor to remove the source virtual address. Upon completion of either step 905 or 906, processor 204 at step 907 for all Targets in this Source's Target List updates the virtual track instance descriptor to include this virtual address and the update count fields flag from the Copy Table. In addition, processor 204 creates a logical cylinder directory entry for this virtual track instance. Finally, processor 204 updates the virtual track directory entry for the Target to point to the new location and to clear the Target Flag. Processor 204 at step 908 removes this Source and all its Targets from the Copy Table. Processor 204 also scans the Copy Table for Sources with the same virtual address and clears the Source Flag. The changes are then journaled to the virtual track directory and to the Copy Table.

While a specific embodiment of this invention has been disclosed herein, it is expected that those skilled in the art can design other embodiments that differ from this particular embodiment but fall within the scope of the appended claims.

We claim:

1. A disk memory system for storing data records for at least one associated data processor comprising:

a plurality of disk drives, a subset of said plurality of disk drives being configured into at lest two redundancy groups, each redundancy group consisting of at lest two disk drives;

means, responsive to the receipt of a stream of data records from said associated data processor, for selecting first available memory space in one of said redundancy groups to store said received stream of data records thereon;

means for writing said received stream of data records and redundancy data associated with said received stream of data records in said selected first available memory space in said selected redundancy group;

means, responsive to the subsequent receipt of modifications to one of said data records stored in said first available memory space in said selected redundancy group from said associated data processor, for writing said modified data record, exclusive of the rest of said received stream of data records and said redundancy data associated with said received stream of data records written in said first available memory space, in second available memory space in one of said redundancy groups by including said modified data record with a stream of data records subsequently received by said writing means; and means for converting said first available memory space used to store said originally received data record to available memory space.

2. The system of claim 1 further comprising:

means, responsive to one of said redundancy groups containing available memory space on at least one of said at least two disk drives at a particular memory address, wherein the corresponding particular memory address on one of said at least two disk drives does not contain available memory space, for removing data records from the one of said at least two disk drives that does not contain available memory space at the corresponding memory address to make memory space available on all said at least two disk drives at said particular memory address.

3. The system of claim 2 further comprising:

means, responsive to said removing means, for combining said removed data records with at least one data record received from said associated data processor to form a merged stream of data records; and means for writing successive parts of said merged stream of data records on corresponding ones of said at least two disk drives in one of said redundancy groups.

4. The system of claim 1 further comprising:
means for reserving at least one of said plurality of disk drives as backup disk drives, which backup disk drives are shared in common by said redundancy groups;
means for identifying one of said at least two disk drives in one of said redundancy groups that fails to function; and
means for switchably connecting one of said backup disk drives in place of said identified failed disk drive.

5. The system of claim 4 further including:
means for reconstructing said stream of data records written on said identified failed disk drive, using said associated redundancy data; and
means for writing said reconstructed stream of data records on to said one backup disk drive.

6. The system of claim 5 wherein said reconstructing means includes:
means for generating said stream of data records written on said identified failed disk drive using said associated redundancy data and the data records written on the remaining disk drives in said redundancy group.

7. The system of claim 6 wherein said generating means includes:
means for generating multi-bit error codes to produce at least two redundancy segments for said received streams of data records.

8. The system of claim 1 further including:
means for maintaining data indicative of the correspondence between each said received stream of data records and the identity of the one of said at least two disk drives in said selected redundancy group on which said received stream of data records is stored.

9. In a disk memory system, having a plurality of disk drives, a number of said plurality of disk drives being configured into at least two redundancy groups, each redundancy group consisting of at least two disk drives, a method of storing data records for at least one associated data processor comprising the steps of:
selecting, in response to the receipt of a stream of data records from said associated data processor, first available memory space in one of said redundancy groups to store said received stream of data records thereon;
writing said received stream of data records and redundancy data associated with said received stream of data records in said selected first available memory space in said selected redundancy group;
writing, in response to the subsequent receipt of modifications to one of said data records stored in said first available memory space in said selected redundancy group from said associated data processor, said modified data record, exclusive of the rest of said received stream of data records and said redundancy data associated with said received stream of data records written in said first available memory space, in second available memory space in one of said redundancy groups by including said modified data record with a stream of data records subsequently received for said step of writing; and
converting said first available memory space used to store said originally received data record to available memory space.

10. The method of claim 9 further comprising the step of:
removing, in response to one of said redundancy groups containing available memory space on at least one of said at least two disk drives at a particular memory address, wherein the corresponding particular memory address on one of said at least two disk drives does not contain available memory space, data records from the one of said at least two disk drives that does not contain available memory space at the corresponding memory address to make memory space available on all said at least two disk drives at said particular memory address.

11. The method of claim 10 further comprising the steps of:
combining said removed data records with at least one data record received from said associated data processor to form a merged stream of data records; and
writing successive parts of said merged stream of data records on corresponding ones of said at least two disk drives in one of said redundancy groups.

12. The method of claim 9 further comprising the steps of:
reserving at least one of said of disk drives as backup disk drives, which backup disk drives are shared in common by said redundancy groups;
identifying one of said at least two disk drives in one of said redundancy groups that fails to function; and
switchably connecting one of said backup disk drives in place of said identified failed disk drive.

13. The method of claim 12 further including the steps of:
reconstructing said stream of data records written on said identified failed disk drive, using said associated redundancy data; and
writing said reconstructed stream of data records on to said one backup disk drive.

14. The method of claim 13 wherein said step of reconstructing includes:
generating said stream of data records written on said identified failed disk drive using said associated redundancy data and the data records written on the remaining disk drives in said redundancy group.

15. The method of claim 14 wherein said step of generating includes:
generating multi-bit error codes to produce at least two redundancy segments for said received streams of data records.

16. The method of claim 9 further including the step of:
maintaining data indicative of the corresponding between said received streams of data records and the identity of the one of said at least two disk drives in said selected redundancy group on which said received streams of data records are stored.

17. A disk memory system for storing data records that are accessible by at least one associated data processor comprising:
a plurality of disk drives for storing data thereon, a number of said disk drives being configured into at least two redundancy groups, each said redundancy group including n+m of said plurality of disk drives, where n and m are both positive integers with n greater than 1 and m equal to or greater than 1;

means for storing each stream of data records received from said associated data processing devices on successive ones of said n disk drives in first available memory space in a selected redundancy group;

means, responsive to said storing means storing streams of data records on all n disk drives in said first available memory space in said selected redundancy group, for generating m segments of data redundancy information for said data records stored on said n disk drives;

means for writing said m segments of redundancy data on to said m disk drives in said first available memory space in said selected redundancy group;

means, responsive to the subsequent receipt of modifications to one of said data records stored in said first available memory space in said selected redundancy group from said associated data processor, for writing said modified data record, exclusive of the rest of said received stream of data records and said redundancy data associated with said received stream of data records written in said first available memory space, in second available memory space in one of said redundancy groups by including said modified data record with a stream of data records subsequently received by said storing means; and means for converting said first available memory space used to store said originally received data record to available memory space.

18. The system of claim 17 further comprising:
means, responsive to one of said redundancy groups containing available memory space on at least one of said n disk drives at a particular memory address, wherein the corresponding particular memory address on the remaining ones of said n disk drives do not contain available memory space, for removing data records from the ones of said remaining n disk drives that do not contain available memory space at the corresponding memory address to make memory space available on all said n disk drives at said particular memory address.

19. The system of claim 18 further comprising:
means, responsive to said removing means, for combining said removed data records with at least one data record received from said associated data processor to form a merged stream of data records; and
means for writing successive parts of said merged stream of data records on corresponding ones of said n disk drives in one of said redundancy groups.

20. The system of claim 17 further including:
means for reserving r of said plurality of disk drives as backup disk drives, where r is a positive integer, which backup disk drives are shared in common by all said redundancy groups;
means for identifying one of said n+m disk drives that fails to function; and
means for switchably connecting one of said backup disk drives in place of said failed disk drive.

21. The system of claim 20 further including:
means for reconstructing said stream of data records written on said failed disk drive, using said associated redundancy data; and
means for writing said reconstructed stream of data records on to said one backup disk drive.

22. The system of claim 21 wherein said reconstructing means includes:
means for generating said stream of data records written on said failed disk drive using said associated redundancy data and the remaining ones of said n stream of data records.

23. The system of claim 22 wherein said generating means includes:
means for generating multi-bit error codes to produce m redundancy segments for each n received streams of data records.

24. The system of claim 17 further including:
means for maintaining data indicative of the correspondence between each said received stream of data records and the identity of the one of said n+m disk drives in said one redundancy group on which said received stream of data records is written.

25. In a disk memory system having a plurality of disk drives for storing data thereon, a number of said disk drives being configured into at least two redundancy groups, each said redundancy group including n+m of said plurality of disk drives, where n and m are both positive integers, with n being greater than 1 and m being equal to or greater than 1, for storing data records that are accessible by at least one associated data processor comprising the steps of:

storing each stream of data records received from said associated data processing devices on successive ones of said n disk drives in first available memory space in a selected redundancy group;

generating, in response to storing streams of data records on all n disk drives in said first available memory space in said selected redundancy group for generating m segments of data redundancy information for said streams of data records stored on said n disk drives;

writing said m segments of redundancy data on to said m disk drives in aid first available memory space in said selected redundancy group;

writing, in response to the subsequent receipt of modifications to one of said data records stored in said first available memory space in said selected redundancy group from said associated data processor, said modified data record, exclusive of the rest on said received stream of data records and said m segments of redundancy data associated with said received stream of data records written in said first available memory space, in second available memory space in one of said redundancy groups by including said modified data record with a stream of data records subsequently received for said step of storing; and converting said first available memory space used to store said originally received data record to available memory space.

26. The method of claim 25 further comprising the step of:
removing, in response to one of said redundancy groups containing available memory space on at least one of said n disk drives at a particular memory address, wherein the corresponding particular memory address on the remaining ones of said n disk drives do not contain available memory space, data records from the ones of said remaining n disk drives that do not contain available memory space at the corresponding memory address to make memory space available on all said n disk drives at said particular memory address.

27. The method of claim 26 further comprising the steps of:
combining said removed data records with at least one data record received from said associated data processor to form a merged stream of data records; and
writing successive parts of said merged stream of data records on corresponding ones of said n disk drives in one of said redundancy groups.

28. The method of claim 25 further including the steps of:
reserving r of said plurality of disk drives as backup disk drives, where r is a positive integer, which backup disk drives are shared in common by all said redundancy groups;
identifying one of said n+m disk drives that fails to function; and
switchably connecting one of said backup disk drives in place of said failed disk drive.

29. The method of claim 28 further including the steps of:
reconstructing said stream of data records written on said failed disk drive, using said associated redundancy data; and
writing said reconstructed stream of data records on to said one backup disk drive.

30. The method of claim 29 wherein said step of reconstructing includes:
generating said stream of data records written on said failed disk drive using said associated redundancy data and the remaining ones of said n streams of data records.

31. The method of claim 30 wherein said step of generating includes:
generating multi-bit error codes to produce m redundancy segments for each n received streams of data records.

32. The method of claim 25 further including the step of:
maintaining data indicative of the correspondence between each said received stream of data records and the identity of the one of said n+m disk drives in aid one redundancy group on which said received stream of data records is written.

33. A disk memory system for storing data records for at least one associated data processor comprising:
a plurality of disk drives, a number of said plurality of said disk drives configured of n+m disk drives, where n and m are both positive integers with n being greater than 1 and m being equal to or greater than 1;
means, responsive to the receipt of n streams of data records from said associated data processor, for storing said n received streams of data records;
means for generating m redundancy segments using said n received streams of data records;
means for writing said n received streams of data records and said m redundancy segments in first available memory space in a selected one of said redundancy groups, one said received streams of data records and one said redundancy segment on a corresponding one of said n+m disk drives in said selected redundancy group;
means, responsive to the subsequent receipt of modifications to one of said data records stored in said first available memory space in said selected redundancy group from said associated data processor, for writing said modified data record, exclusive of the rest of said n received stream of data records and said m redundancy segments associated with said n received streams of data records written in said first available memory space, in second available memory space in one of said redundancy groups by including said modified data record with a n streams of data records subsequently received by said writing means; and
means for converting said first available memory space used to store said originally received data record to available memory space.

34. The system of claim 33 further comprising:
means, responsive to one of said redundancy groups containing available memory space on at least one of said n+m disk drives at a particular memory address, wherein the corresponding particular memory address on the remaining ones of said n+m disk drives do not contain available memory space, for removing data records from the said remaining ones of said n+m disk drives that do not contain available memory space at said corresponding particular memory address to make memory space available on all said n+m disk drives at said particular memory address.

35. The system of claim 34 further comprising:
means, responsive to said removing means, for applying said removed data records to said storing means to be combined with at least one data record received form said associated data processor to form n streams of data records for storage in one of said redundancy groups.

36. The system of claim 35 further including:
means for selecting r of said plurality of disk drives as backup disk drives, where r is a positive integer, which backup disk drives are shared in common by said redundancy groups.

37. The system of claim 36 further including:
means for identifying one of said disk drives in a redundancy group that fails to function;
means for reconstructing said stream of data records written on said failed disk drive, using said associated redundancy data; and
means for writing said reconstructed stream of data records on to one of said backup disk drives.

38. The system of claim 37 wherein said reconstructing means includes:
means for generating said stream of data records written on said identified failed disk drive using said associated redundancy data and the remaining ones of said n received streams of data records stored on said n disk drives.

39. The system of claim 38 wherein said generating means includes:
means for generating multi-bit error codes to produce m redundancy segments for each n received streams of data records.

40. The system of claim 33 further including:
means for maintaining data indicative of the correspondence between each said received stream of data records and the identity of the one of said n disk drives in said selected redundancy group on which said received stream of data records is stored.

41. In a disk memory system having a plurality of disk drives, a number of said plurality of said disk drives configured into at least two redundancy groups, each redundancy group consisting of n+m disk drives, where n and m are both positive integers, with n being greater than 1 and m being equal to or greater than 1, a method of storing data records for at least one associated data processor comprising the steps of:

storing, in response to the receipt of n streams of data records from said associated data processor, said n received streams of data records;

generating m redundancy segments using said n received streams of data records;

writing said n received streams of data records and said m redundancy segments in first available memory space in a selected one of said redundancy groups, one said received stream of data records and one said redundancy segment on a corresponding one of said n+m disk drives in said selected redundancy group;

writing, in response to the subsequent receipt of modifications to one of said data records stored in said first available memory space in aid selected redundancy group from said associated data processor, said modified data record, exclusive of the rest of said n received streams of data records and said m redundancy segments associated with said n received streams of data records written in said first available memory space, in second available memory space in one of said redundancy groups by including said modified data record with a n streams of data records subsequently received for said step of writing; and converting said first available memory space used to store said originally received data record to available memory space.

42. The method of claim 41 further comprising the step of:

removing, in response to one of said redundancy groups containing available memory space on at least one of said n+m disk drives at a particular memory address, wherein the corresponding particular memory address on the remaining ones of said n+m disk drives do not contain available memory space, data records from the said remaining ones of said n+m disk drives that do not contain available memory space at said corresponding particular memory address to make memory space available on all said n+m disk drives at said particular memory address.

43. The method of claim 42 further comprising the step of:

combining said removed data records with at least one data record received from said associated data processor to form n streams of data records for storage in one of said redundancy groups.

44. The method of claim 43 further including the step of:

selecting r of said plurality of disk drives as backup disk drives, where r is a positive integer, which backup disk drives are shared in common by said redundancy groups.

45. The method of claim 44 further including the steps of:

identifying one of said disk drives in a redundancy group that fails to function;

reconstructing said stream of data records written on said failed disk drive, using said associated redundancy data; and writing said reconstructed stream of data records on to one of said backup disk drives.

46. The method of claim 45 wherein said step of reconstructing includes the step of:

generating said stream of data records written on said identified failed disk drive using said associated redundancy data and the remaining ones of said n received streams of data records stored on said n disk drives.

47. The method of claim 46 wherein said step of generating includes:

generating multi-bit error codes to produce m redundancy segments for each n received streams of data records.

48. The method of claim 41 further including the step of:

maintaining data indicative of the correspondence between each said received stream of data records and the identity of the one of said n disk drives in said selected redundancy group on which said received stream of data records is stored.

49. A disk memory system for storing data records for at least one associated data processor comprising:

a plurality of disk drives, a number of said plurality of said disk drives configured into at least two redundancy groups, each redundancy group consisting of n+m disk drives, where n and m are both positive integers with n being greater than 1 and m being equal to or greater than 1;

means, responsive to the receipt of n streams of data records from said associated data processor, for storing said n received streams of data records;

means for generating m redundancy segments using said n received streams of data records;

means for selecting one of said redundancy groups having first available memory space, addressable at the same relative address for each of said n+m disk drives, for storing said n received streams of data records and said m generated redundancy segments;

means for writing said n received streams of data records and said m redundancy segments on said n+m disk drives in said first available memory space in said selected redundancy group, each stream of data records and each redundancy segment at said relative address on a respective one of said n+m disk drives;

means, responsive to the subsequent receipt of modifications to one of said data records, stored at said relative address on one of said n+m disk drives in said first available memory space in said selected redundancy group, from said associated data processor, for writing said modified data record, exclusive of the rest of said n received streams of data records and said m redundancy segments associated with said n received streams of data records written in said first available memory space, in second available memory space in one of said redundancy groups, exclusive of said relative address on said one of said n+m disk drives in said selected redundancy groups by including said modified data record with n streams of data records subsequently received by said writing means; and means for converting said first available memory space, addressable at said relative address on said one of said n+m disk drives in said selected redundancy group, used to stored said originally received data record to available memory space.

50. The system of claim 49 further comprising:

means, responsive to one of said redundancy groups containing available memory space on at least one of said n+m disk drives at a particular memory address, wherein the corresponding particular memory address on the remaining ones of said n+m disk drives do not contain available memory space, for removing data records from the said remaining ones to said n+m disk drives that do not contain available memory space at the corresponding memory address to make memory space available on all said n+m disk drives at said particular memory address.

51. The system of claim 50 further comprising:

means, responsive to said removing means, for applying said removed data records to said storing means to be combined with at least one data record received from said associated data processor to form n streams of data records for storage in one of said redundancy groups.

52. The system of claim 51 further including:

means for selecting r of said plurality of disk drives as backup disk drives, where r is a positive integer, which backup disk drives are shared in common by said redundancy groups.

53. The system of claim 52 further including:

means for identifying one of said disk drives in a redundancy group that fails to function;

means for reconstructing said stream of data records written on said failed disk drive, using said associated redundancy data; and means for writing said reconstructed stream of data records on to one of said backup disk drives.

54. The system of claim 53 wherein said reconstructing means includes:

means for generating said stream of data records written on said identified failed disk drive using said associated redundancy data and the remaining ones of said n streams of data records in said selected redundancy group.

55. The system of claim 54 wherein said generating means includes:

means for generating multi-bit error codes to produce m redundancy segments for each n received streams of data records that are stored in a selected redundancy group.

56. The system of claim 49 further including:

means for maintaining data indicative of the correspondence between each said received stream of data records and the identity of the one of said n disk drives in said selected redundancy group on which said received stream of data records is stored.

57. In a disk memory system having a plurality of disk drives, a number of said plurality of said disk drives configured into at least two redundancy groups, each redundancy group consisting of n+m disk drives, where n and m are both positive integers, with n being greater than 1 and m being equal to or greater than 1, for storing data records for at least one associated data processor comprising the steps of:

storing, in response to the receipt of n streams of data records from said associated data processor, said n received streams of data records;

generating m redundancy segments using said n received streams of data records;

selecting one of said redundancy groups having first available memory space, addressable at the same relative address for each of said n+m disk drives, for storing said n received streams of data records and said m generated redundancy segments;

writing said n received streams of data records and said m redundancy segments on said n+m disk drives in said first available memory space in said selected redundancy group, each stream of data records and each redundancy segment at said relative address on a respective one of said n+m disk drives;

writing, in response to the subsequent receipt of modifications to one of said data records, stored at said relative address on one of said n+m disk drives in said first available memory space in said selected redundancy group, from said associated data processor, said modified data record, exclusive of the rest of said n received streams of data records and said m redundancy segments associated with said n received streams of data records written in said first available memory space, in second available memory space in one of said redundancy groups, exclusive of said relative address on said one of said n+m disk drives in said selected redundancy group by including said modified data record with n streams of data records subsequently received for said step of writing; and converting said first available memory space, addressable at said relative address on said one of said n+m disk drives in said selected redundancy group, used to store said originally received data record to available memory space.

58. The method of claim 57 further comprising the step of:

removing, in response to one of said redundancy groups containing available memory space on at least one of said n+m disk drives at a particular memory address, wherein the corresponding particular memory address on the remaining ones of said n+m disk drives do not contain available memory space, data records from the said remaining ones of said n+m disk drives that do not contain available memory space at the corresponding memory address to make memory space available on all said n+m disk drives at said particular memory address.

59. The method of claim 58 further comprising the step of:

combining said removed data records with at least one data record received from said associated data processor to form n streams of data records for storage in one of said redundancy groups.

60. The method of claim 59 further including the step of:

selecting r of said plurality of disk drives as backup disk drives, where r is a positive integer, which backup disk drives are shared in common by said redundancy groups.

61. The method of claim 60 further including the steps of:

identifying one of said disk drives in a redundancy group that fails to function;

reconstructing said stream of data records written on said failed disk drive, using said associated redundancy data; and writing said reconstructed stream of data records on to one of said backup disk drives.

62. The method of claim 61 wherein said step of reconstructing includes the step of:

generating said stream of data records written on said identified failed disk drive using said associated redundancy data and the remaining ones of said n streams of data records in said selected redundancy group.

63. The method of claim 62 wherein said step of generating includes:
generating multi-bit error codes to produce m redundancy segments for each n received streams of data records that are stored in a selected redundancy group.

64. The method of claim 57 further including the step of:
maintaining data indicative of the correspondence between each said received streams of data records and the identity of the one of said n disk drives in said selected redundancy group on which said received stream of data records is stored.

65. A disk memory system for storing data records for at least one associated data processor comprising:
a plurality of disk drives, a number of said plurality of said disk drives configured into at least two redundancy groups, each redundancy group consisting of n+m disk drives, where n are both positive integers greater than 1 and m is at least equal to 1, and said disk drives each including a like plurality of physical tracks to form sets of physical tracks called logical tracks, each logical track having one physical track at the same relative address on each of said n+m disk drives, for storing streams of data records thereon;
means, responsive to the receipt of n streams of data records from said associated data processor, for storing said n received streams of data records;
means for selecting a first available one of said logical tracks in one of said redundancy groups, having an available physical track addressable at the same relative address for each of said n+m disk drives;
means for writing said n received streams of data records and said m redundancy segments on said n+m disk drives in said selected first available logical track, each stream of data records and each redundancy segment at said selected available physical track on a respective one of said n+m disk drives;
means, responsive to the subsequent receipt of modifications to one of said data records, stored on said selected physical track on one of said n+m disk drives in said selected first available logical track, from said associated data processor, for writing said modified data record, exclusive of the rest of said n received streams of data records and said m redundancy segments associated with said n received streams of data records written in said first available logical track, in a second available logical track in one of said redundancy groups, exclusive f said selected physical track on said one of said n+m disk drives in said selected first available logical track by including said modified data record with n streams of data records subsequently received by said writing means; and
means for converting said selected physical track, addressable at said relative address on said one of said n+m disk drives in said selected redundancy group, used to store said originally received data record to an available physical track.

66. The system of claim 65 further comprising:
means, responsive to one of said sets of physical tracks in a redundancy group containing available memory space on at least one of said n+m disk drives in a logical track, wherein the corresponding physical tracks on the remaining disk drives of said logical track do not contain available memory space, for removing data records from the said remaining physical tracks of said logical track that do not contain available memory space at the corresponding memory address to make memory space available on all said physical tracks on said n+m disk drives at said particular memory address.

67. The system of claim 66 further comprising:
means, responsive to said removing means, for applying said removed data records to said storing means to be combined with at least one data record received from said associated data processor to form n streams of data records for storing in one of said redundancy groups.

68. The system of claim 67 further including:
means for selecting r of said plurality of disk drives as backup disk drives, where r is a positive integer, which backup disk drives are shared in common by said redundancy groups.

69. The system of claim 68 further including:
means for identifying one of said disk drives in a redundancy group that fails to function;
means for reconstructing said stream of data records written on said failed disk drive, using said associated redundancy data; and
means for writing said reconstructed stream of data records on to one of said backup disk drives.

70. The system of claim 69 wherein said reconstructing means includes:
means for generating said stream of data records written on said identified failed disk drive using said associated redundancy data and the remaining ones of said n streams of data records in said selected redundancy group.

71. The system of claim 70 wherein said generating means includes:
means for generating multi-bit error codes to produce m redundancy segments for each n received streams of data records that are stored in a selected redundancy group.

72. The system of claim 65 further including:
means for maintaining data indicative of the correspondence between each said received stream of data records and the identity of the one of said n disk drives in said selected redundancy group on which said received stream of data records is stored.

73. In a disk memory system having a plurality of disk drives, a number of said plurality of said disk drives configured into at least two redundancy groups, each redundancy group consisting of n+m disk drives, where n and m are both positive integers, with n being greater than 1 and m being equal to or greater than 1, and said disk drives each including a like plurality of physical tracks to form sets of physical tracks called logical tracks, each logical track having one physical track at the same relative address on each of said n+m disk drives, for storing data records thereon; for storing data records for at least one associated data processor comprising the steps of:

storing, in response to the receipt of n streams of data records from said associated data processor, said n received streams of data records;

generating m redundancy segments using said n received streams of data records;

selecting a first available one of said logical tracks in one of said redundancy groups, having at lest one set of available physical tracks addressable at the same relative address for each of said n+m disk drives;

writing said n received streams of data records and said m redundancy segments on said n+m disk drives in said selected first available logical track, each stream of data records and each redundancy segment at said selected available physical track on a respective one of said n+m disk drives;

writing, in response to the subsequent receipt of modifications to one of said data records, stored at said selected physical track on one of said n+m disk drives in said selected first available logical track, from said associated data processor, said modified data record, exclusive of the rest of said n received streams of data records and said m redundancy segments associated with said n received streams of data records written in said first available logical track, in a second available logical track in one of said redundancy groups, exclusive of said selected physical track on said one of said n+m disk drives in said selected first available logical track by including said modified data record with n streams of data records subsequently received for said step of writing; and converting said selected physical track, addressable at said relative address on said one of said n+m disk drives in said selected redundancy group, used to store said originally received data record to an available physical track.

74. The method of claim 73 further comprising the step of:

removing, in response to one of said sets of physical tracks in a redundancy group containing available memory space on at least one of said n+m disk drives in a logical track, wherein the corresponding physical tracks on the remaining disk drives of said logical track do not contain available memory space, data records from the said remaining physical tracks said logical track that do not contain available memory space at the corresponding memory address to make memory space available on all said physical tracks on said n+m disk drives at said particular memory address.

75. The method of claim 74 further comprising the step:

combining said removed data records with at least one data record received from said associated data processor to form n streams of data records for storage in one of said redundancy groups.

76. The method of claim 75 further including the step of:

selecting r of said plurality of disk drives as backup disk drives, where r is a positive integer, which backup disk drives are shared in common by said redundancy groups.

77. The method of claim 76 further including the steps of:

identifying one of said disk drives in a redundancy group that fails to function;

reconstructing said data file written on said failed disk drive, using said associated redundancy data; and writing said reconstructed data file on to one of said backup disk drives.

78. The method of claim 77 wherein said step of means includes:

generating said stream of data records written on said identified failed disk drive using said associated redundancy data and the remaining ones of said n streams of data records in said selected redundancy group.

79. The method of claim 78 wherein said step of generating includes:

generating multi-bit error codes to produce m redundancy segments for each n received streams of data records that are stored in a selected redundancy group.

80. The method of clam 73 further including the step of:

maintaining data indicative of the correspondence between each said received stream of data records and the identity of the one of said n disk drives in said selected redundancy group on which said received stream of data records is stored.

* * * * *